June 29, 1965 R. M. OMAN 3,192,367

FAST MULTIPLY SYSTEM

Filed May 9, 1962 14 Sheets-Sheet 1

INVENTOR

RICHARD M. OMAN

BY Griffin and Stokes

ATTORNEYS

FAST MULTIPLY SYSTEM

Filed May 9, 1962 14 Sheets-Sheet 8

June 29, 1965 R. M. OMAN 3,192,367

FAST MULTIPLY SYSTEM

Filed May 9, 1962 14 Sheets-Sheet 11

FAST MULTIPLY SYSTEM

United States Patent Office 3,192,367

Patented June 29, 1965

3,192,367

FAST MULTIPLY SYSTEM

Richard M. Oman, St. Paul, Minn., assignor to Sperry Rand Corporation, New York, N.Y., a corporation of Delaware Filed May 9, 1962, Ser. No. 193,472

33 Claims. (Cl. 235—164)

The present invention relates to electronic digital computing devices and more particularly to improved binary multiplying devices of the type wherein multiplier digits are sensed in pairs. The present invention provides a binary multiplier wherein a multiplicand may be multiplied by an N digit multiplier in a sequence of $N/4$ iterative cycles with two carry-store-add operations being performed and two pairs of product digits developed in each of the iterative cycles.

In earlier parallel binary multipliers it was a common practice to sense one multiplier digit at a time and add either zero or one times the multiplicand to the partial product. The partial product was then shifted one binary position, the next multiplier digit sensed, and another add operation performed. Thus, if the multiplier contained N digits the multiplicand operation required N iterative cycles each of which included a sense operation, an add operation and a shift operation. On each cycle considerable time had to be allotted to the propagation of carries developed during the add operation.

Recent developments have produced parallel binary multiplier devices wherein the multiplier digits are sensed in pairs. Depending upon the value of the two multiplier digits sensed either zero, one, two, or minus one, times the multiplicand is added to the accumulated partial product and the accumulated partial product shifted two binary orders. Assuming the multiplier contains N digits, these devices perform the multiplication operation in $N/2$ iterative cycles. Although devices of this type reduce the number of addition operations required, the time allotted for propagation of the carries on each addition is the same as for earlier devices.

A primary object of the present invention is to provide improvements in multipliers of the last mentioned type, said improvements resulting in a binary multiplier wherein a multiplicand is multiplied by an N digit multiplier in $N/4$ iterative cycles.

An object of the present invention is to provide a binary multiplier wherein four multiplier digits are sensed, two carry-store-add operations are performed, and four product digits are developed during each iterative cycle.

An object of the present invention is to provide a binary multiplier wherein two pairs of multiplier digits are sensed on each iterative cycle and a carry-store-add operation performed for each pair of multiplier digits sensed. Because carries are stored separately and added in at the time the next partial product is added in, the propagation of carries does not require extra time and the add operations can be carried out at phase rate.

An object of this invention is to provide a binary multiplier of the type wherein zero, one, two, or minus one, times the multiplicand is half-added to the accumulated partial product in response to each pair of multiplier digits sensed, said binary multiplier including means for storing the sum digits and the carry digits resulting from the half-add operation, and full adder means responsive to the two low order sum digits, the low order carry digit, end around carry signals, and carries from the previous full adder means for producing pairs of product digits.

A further object of the invention is to provide a binary multiplier device having multiplicand storage means, multiplier-product storage means, first means for sensing alternate pairs of multiplier digits, second means for sensing the remaining alternate pairs of multiplier digits, first and second half-adder means, first and second sum digit storage means, first and second carry digit storage means, first and second full adder means and a main adder. On each iterative cycle the first sensing means gates zero, one, two or minus one times the multiplicand from the multiplicand register to one set of inputs to the first half-adder means where the gated value is half-added to the accumulated partial product represented by the sum digits and carry digits stored in said second sum and carry digit storage means. The result of the half-add operation is a new accumulated partial product represented by sum digits and carry digits which are entered into the first sum and carry digit storage means. The first full adder means is responsive to the two low order digits of the first sum storage means, the low order digit of the first carry storage means and a carry from the second full adder means and generates two product digits which are entered into the multiplier-product storage register. In like manner, on each iterative cycle the second sensing means, the second half-adder and the second full adder generate two more product digits which are entered into the multiplier-product storage register. After $N/4$ iterative cycles all multiplier digits have ben sensed by the first and second sensing means and the thirty-six low order digits stored in the multiplier-product storage register. However, the higher orders of the accumulated partial product are represented by sum digits in the first sum storage means and carry digits in the first carry storage means. Therefore, in a final correction cycle the sum and carry digits are applied to the Main Adder and Carry Pyramid where the carries are propagated to the left to produce the sign and thirty-five highest order digits of the product.

According to the present invention the adder and half-adder means mentioned above may be constructed according to additive or subtractive logic. In an adder constructed according to additive logic the two operands are added to produce a resultant sum. In an adder constructed according to subtractive logic the complement (modulus of the register) of one operand is subtracted from the other operand to produce a resultant difference. Assuming the same operands are applied to an additive adder and a subtractive adder, the resultant sum produced by the additive adder is equal to the resultant difference produced by the subtractive adder.

In like manner, a half-add operation may be performed by either an additive half-adder or a subtractive half-adder. The additive half-adder produces sum digits and carry digits while the subtractive half-adder produces difference digits and borrow digits. The term half-adder (or half-subtractor) as used herein differs from the conventional usage. The half-adders or half-subtractors employed herein produce a result obtained by full-adding first and second operands and carry digits. In this respect they are full adders. However, the carry digits added are not the carries produced by adding the first and second operands but are carries resulting from a preceding half-add operation, thus making them different from conventional full adders. The result obtained by the half-adders used herein is actually a series of sum digits and a series of carry digits. In this respect they are similar to devices heretofore referred to as half-adders hence this term is employed in the following description. The term full adder as employde herein refers to an arithmetic unit which produces sum digits (and possibly an overflow digit from the highest order) representing the sum of the operands applied thereto.

Therefore, a further object of the present invention is to provide a binary multiplier wherein two pairs of multiplier digits are sensed on each iterative cycle and the carry-store-add operation performed in a subtractive half-adder for each pair of multiplier digits sensed. Because borrows are stored separately and subtracted at the time the next partial product is half-subtracted, the progagation of borrows does not require extra time and the subtractive operations can be carried out at phase rate.

A further object of this invention is to provide a binary multiplier of the type wherein the complement of zero, one, two, or minus one, times the multiplicand is half-subtracted from the accumulated partial product in response to each pair of multiplier digits sensed, said multiplier including means for storing the differences without borrow and the borrows resulting from the half-subtract operation, and full subtract means responsive to the two low order difference digits, the low order borrow digit, end around borrow signals, and carries from the previous full subtractor for producing pairs of product digits.

Still another object of the invention is to provide a binary multiplier having multiplicand storage means, multiplier-product storage means, first means for sensing alternate pairs of multiplier digits, second means for sensing the remaining alternate pairs of multiplier digits, first and second subtractive half-adder means, first and second difference digit storage means, first and second borrow digit storage means, first and second full subtractors and a main adder. On each iterative cycle the first sensing means gates zero, one, two, or minus one, times the multiplicand from the multiplicand register to one set of inputs of the first subtractive half-adder means where the gated value is half-added to the accumulated partial product represented by the difference digits and borrow digits stored in said second difference and borrow digit storage means. The result of the half-add operation is a new accumulated partial product represented by difference digits and borrow digits which are entered into the first difference and borrow digit storage means. The first full subtractor is responsive to the two low order digits of the first difference storage means, the low order digit of the first borrow storage means and a borrow from the second full subtract means and generates two product digits which are entered into the multiplier-product storage register. In like manner, on each iterative cycle the second sensing means, the second subtractive half-adder and the second full subtractor generate two more product digits which are entered into the multiplier-product storage register. After $N/4$ iterative cycles all multiplier digits have been sensed by the first and second sensing means in the thirty-six low order digits stored in the multiplier-product storage register. However, the higher orders of the accumulated partial product are represented by difference digits in the first difference storage means and borrow digits in the first borrow storage means. In a final correction cycle, the main adder half-subtracts the borrow digits from the difference digits to produce the sign in thirty-five highest order digits of the product.

Other objects of the invention and its mode of operation will become apparent upon consideration of the following description taken in conjunction with the accompanying drawings in which.

Figure 4A:
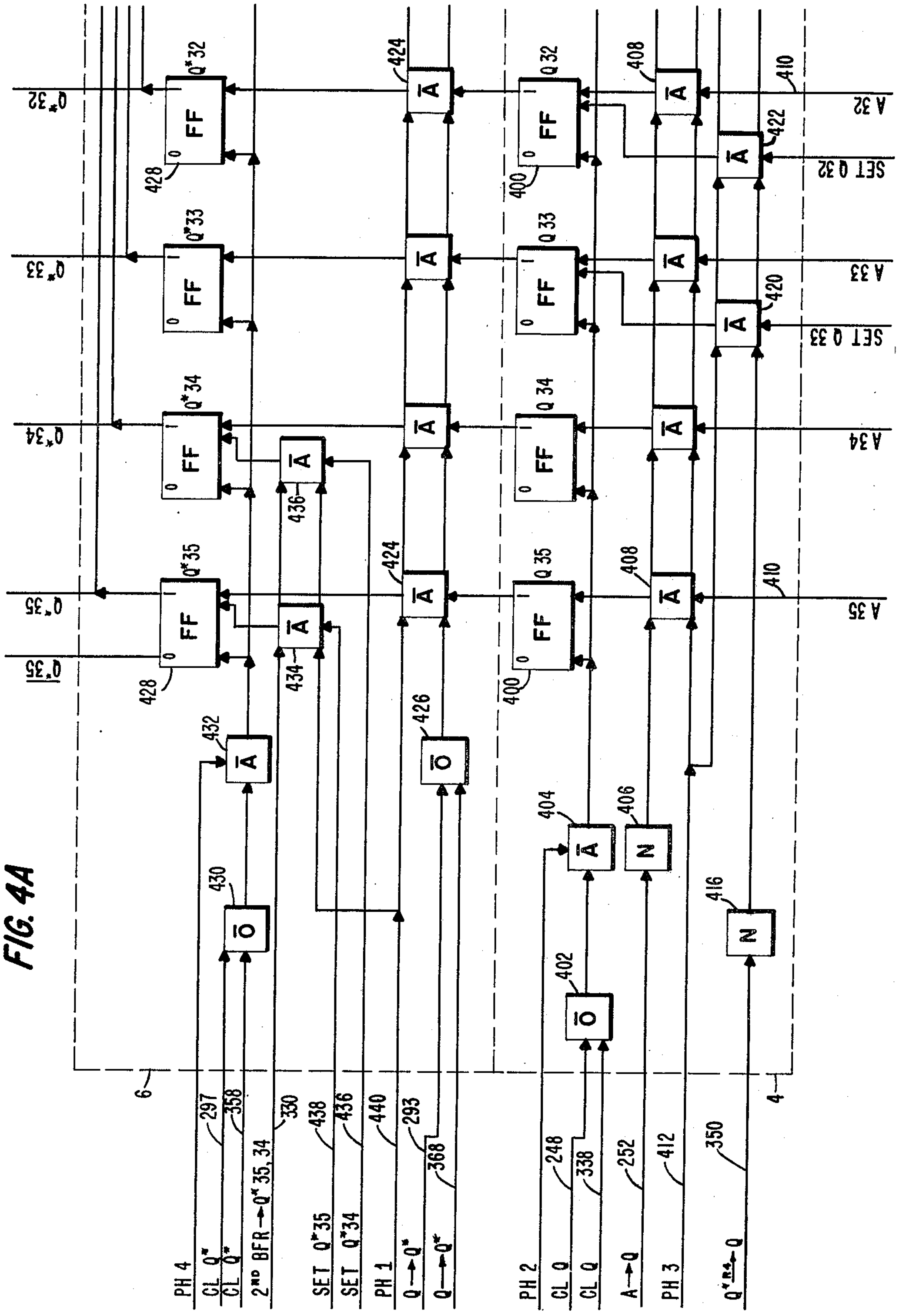
Figure 4B:
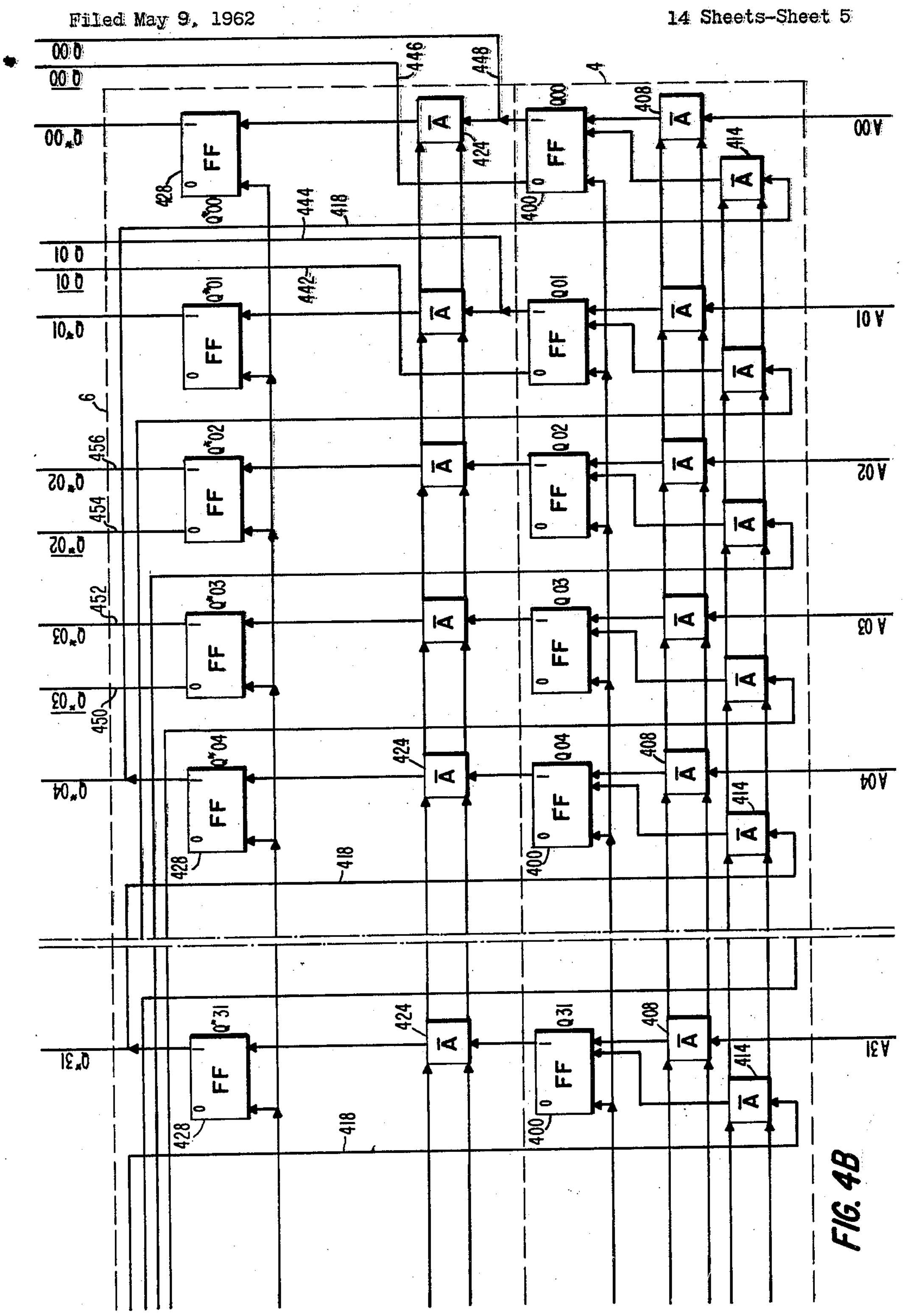
Figure 5:
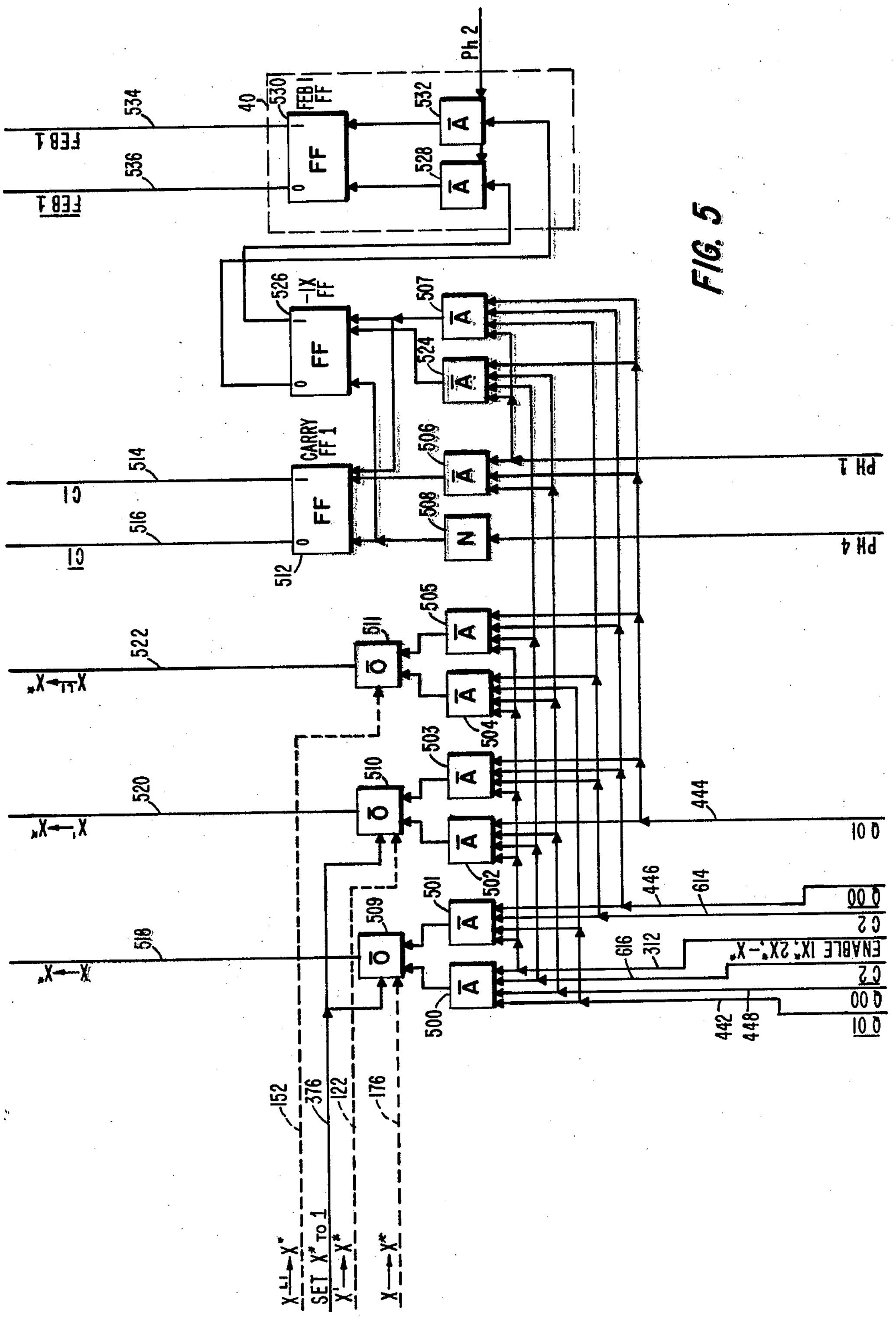
Figure 6:
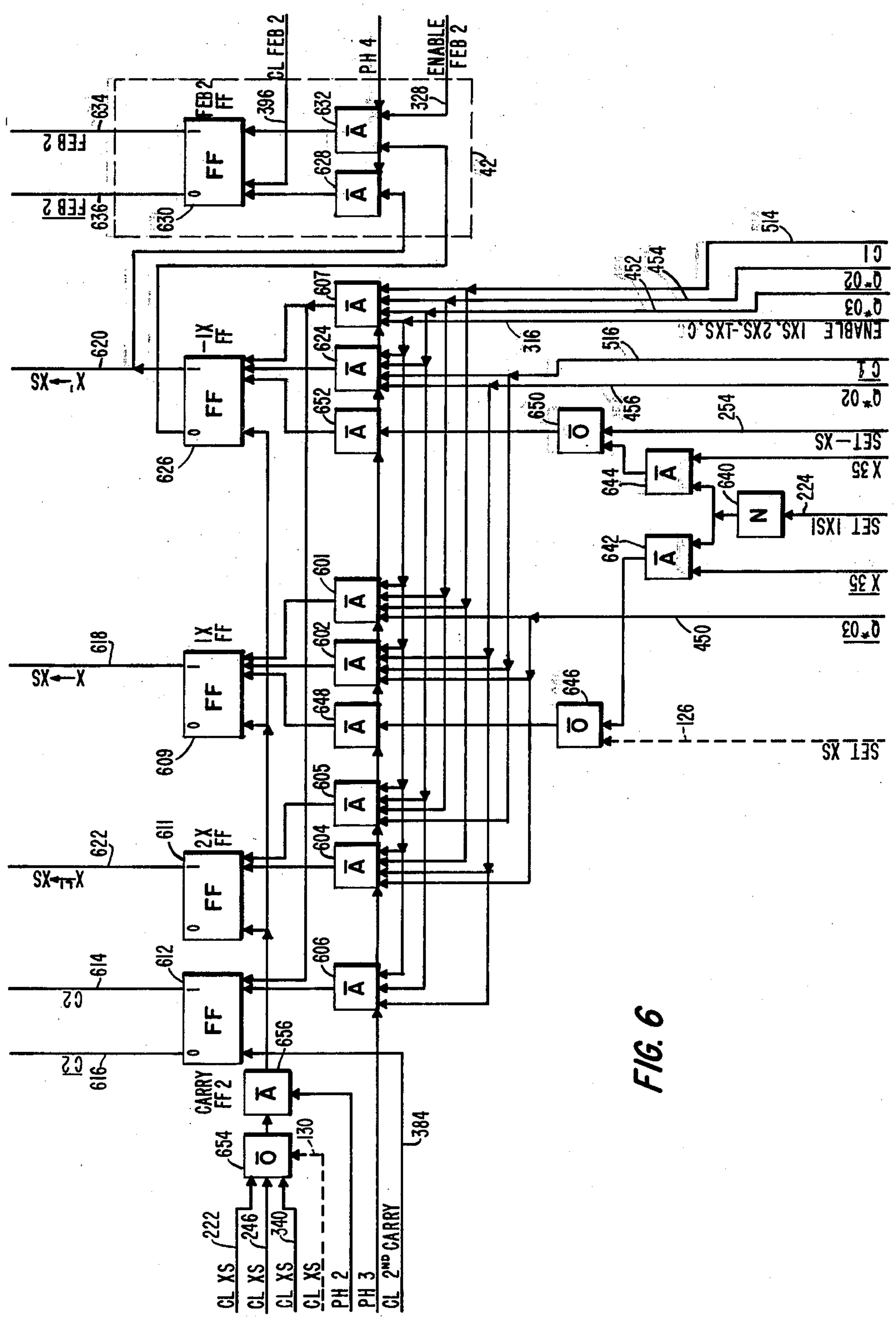
Figure 7C:
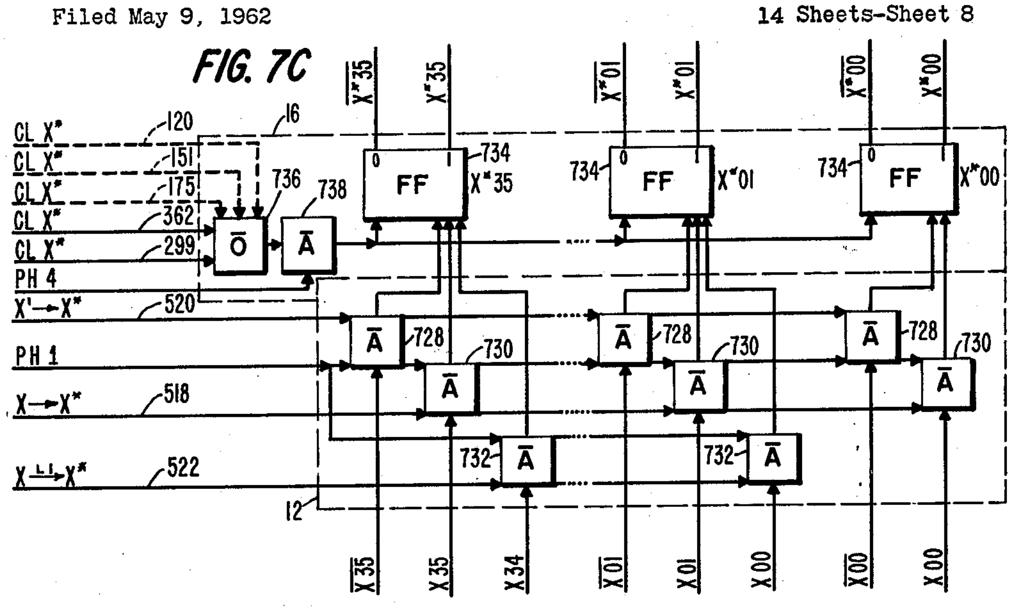
Figure 7B:
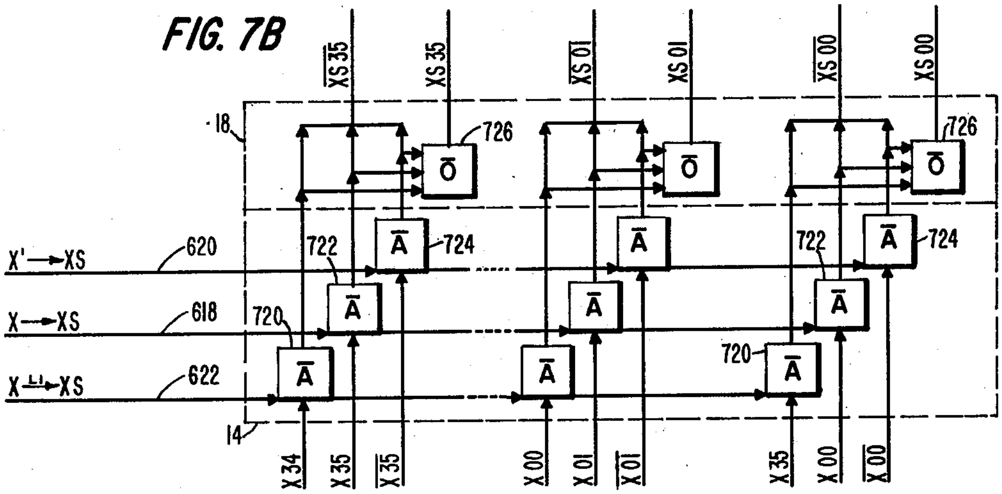
Figure 7A:
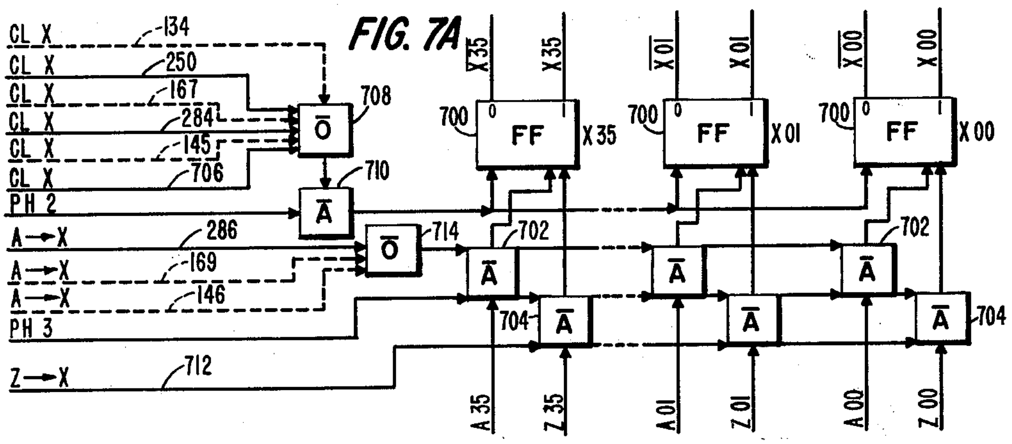
Figure 8:
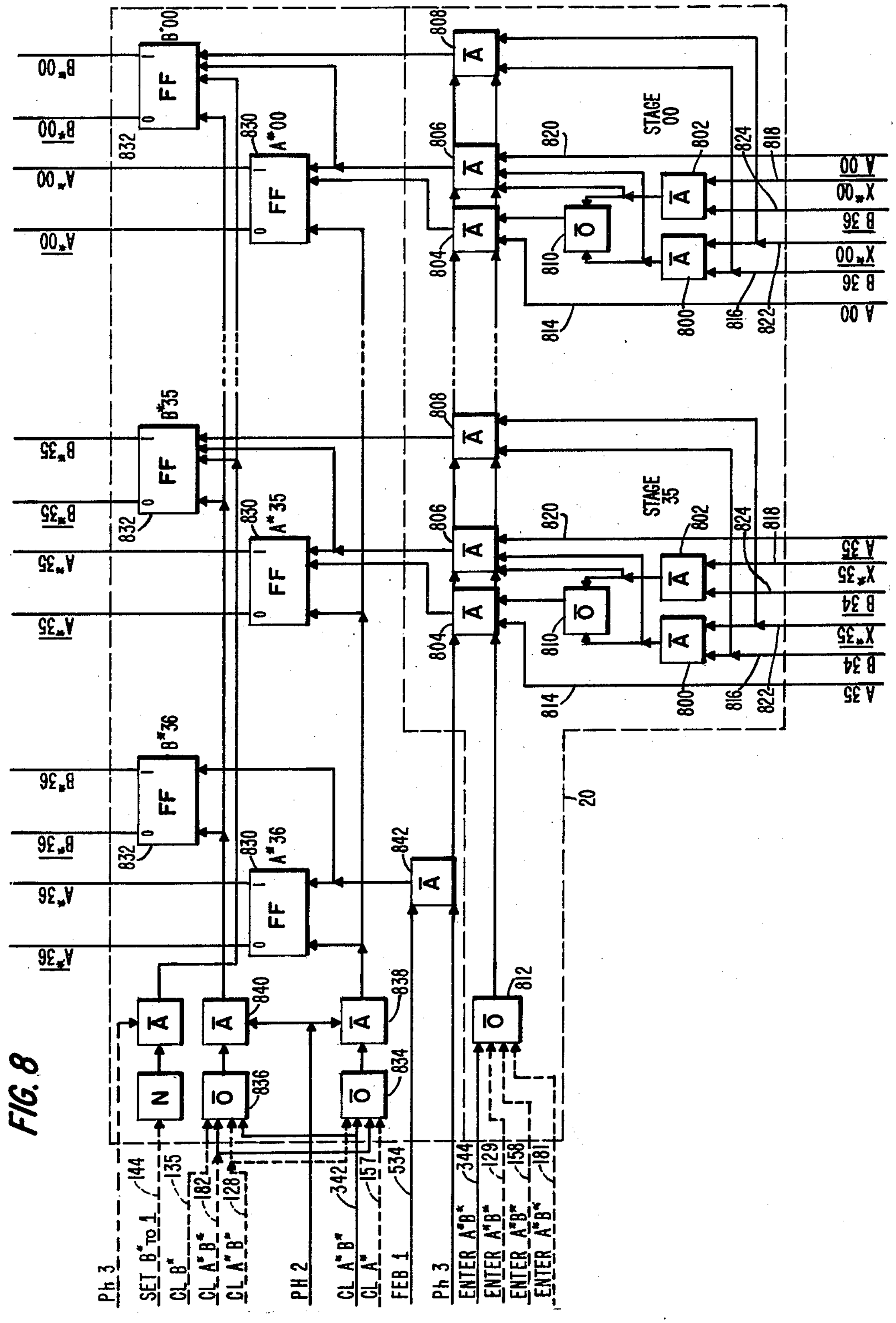
Figure 9A:
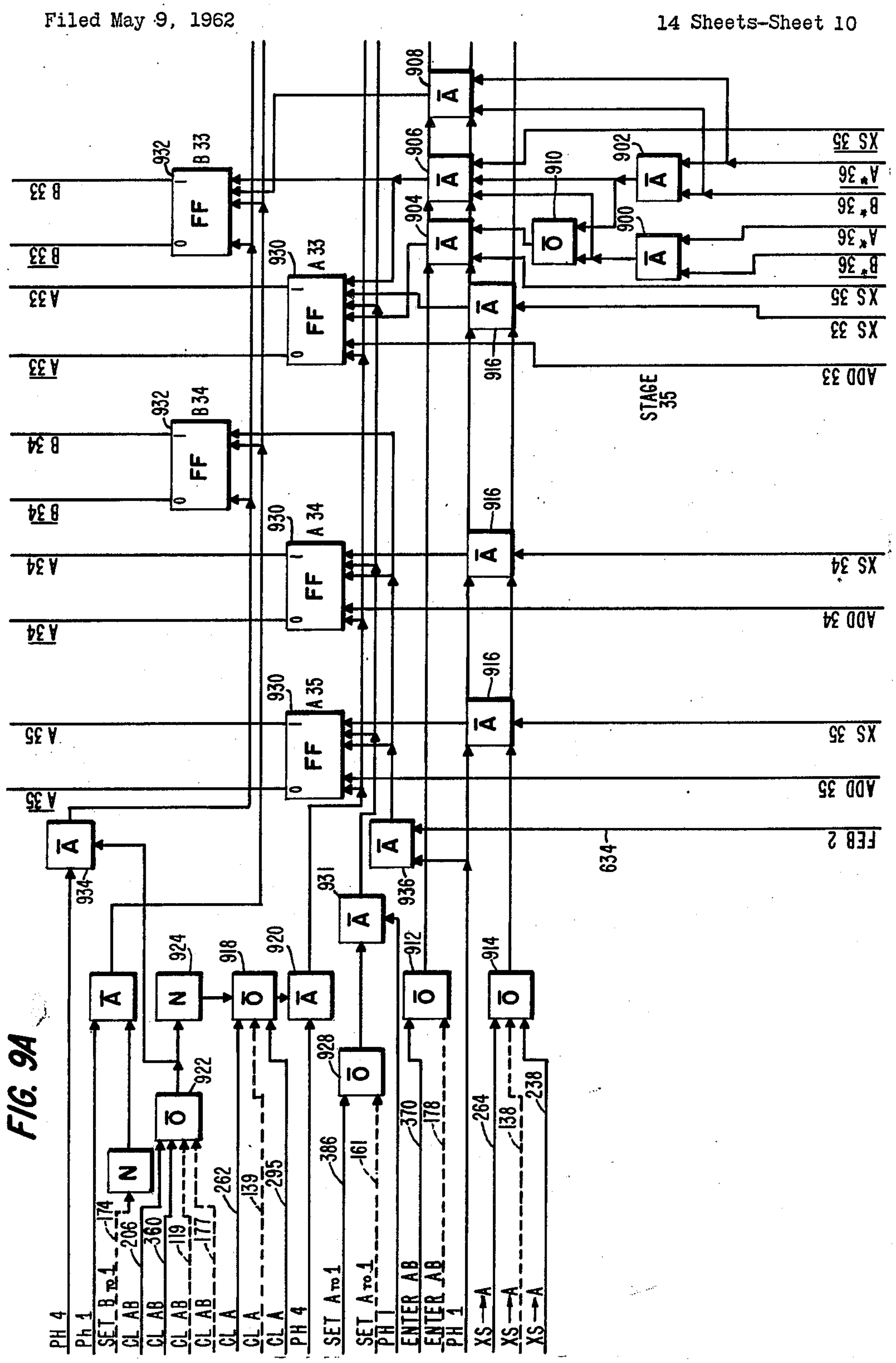
Figure 9B:
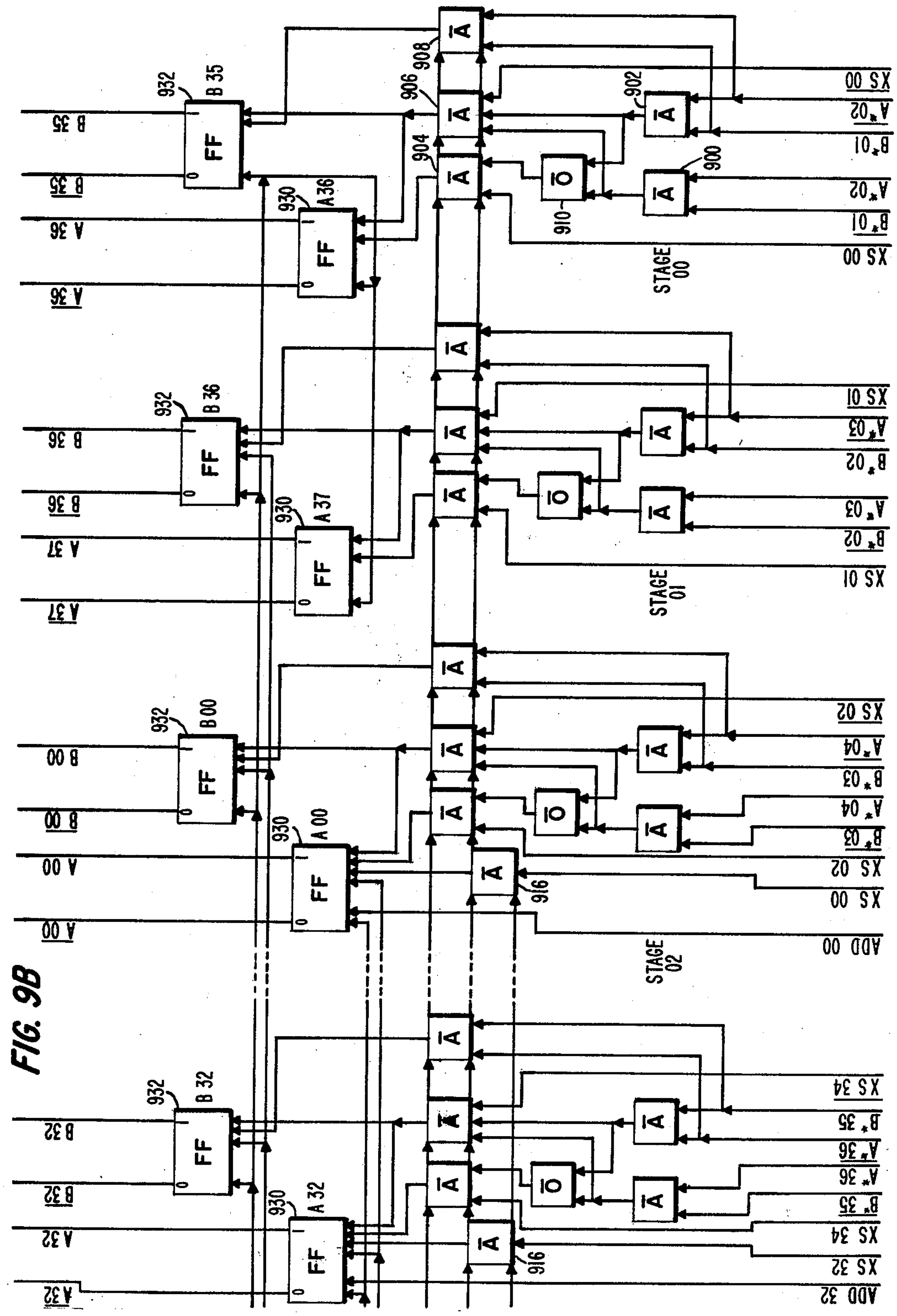
Figure 11:
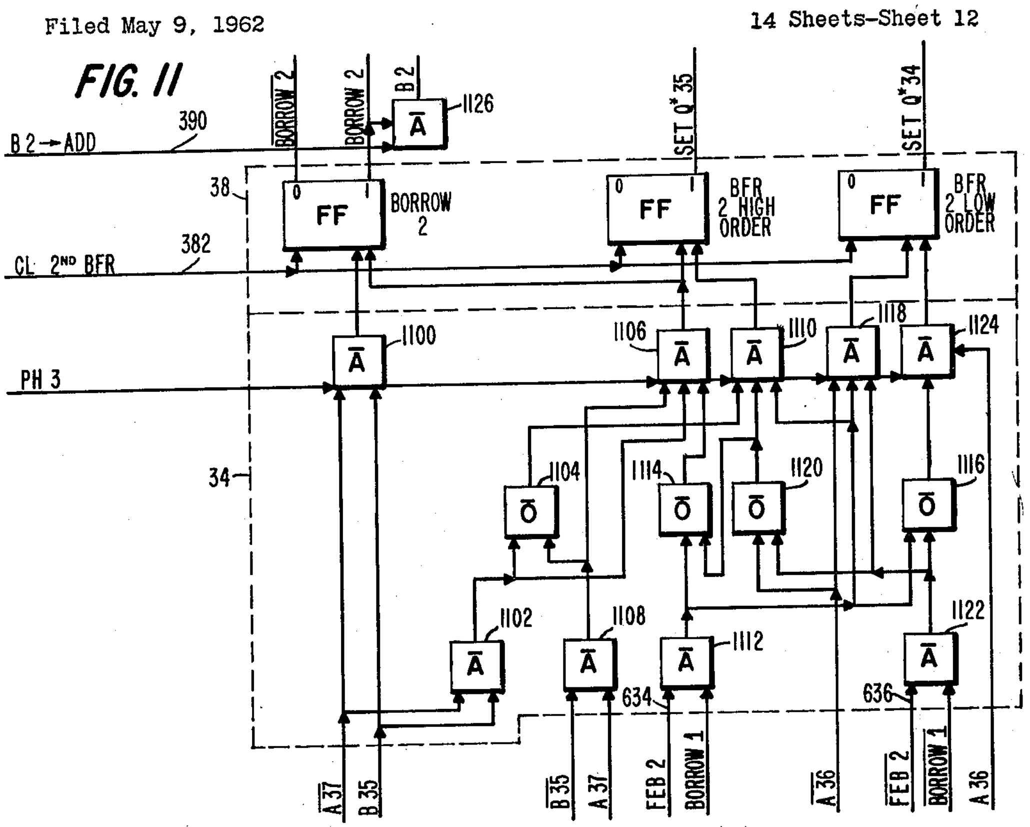
Figure 10:
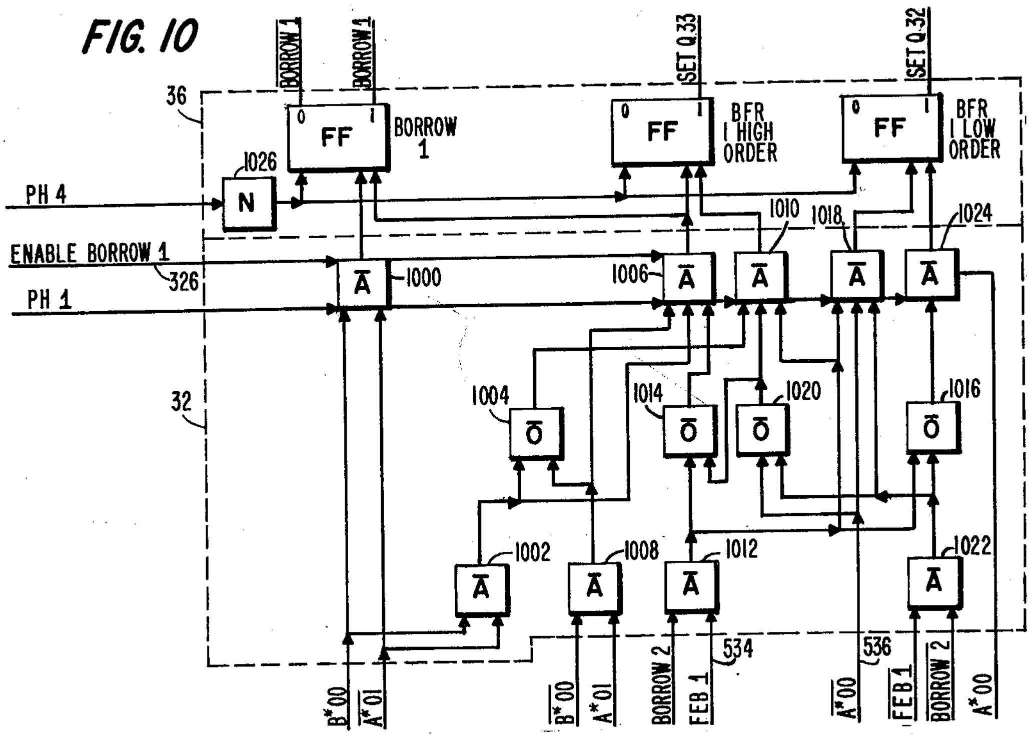
Figure 12:
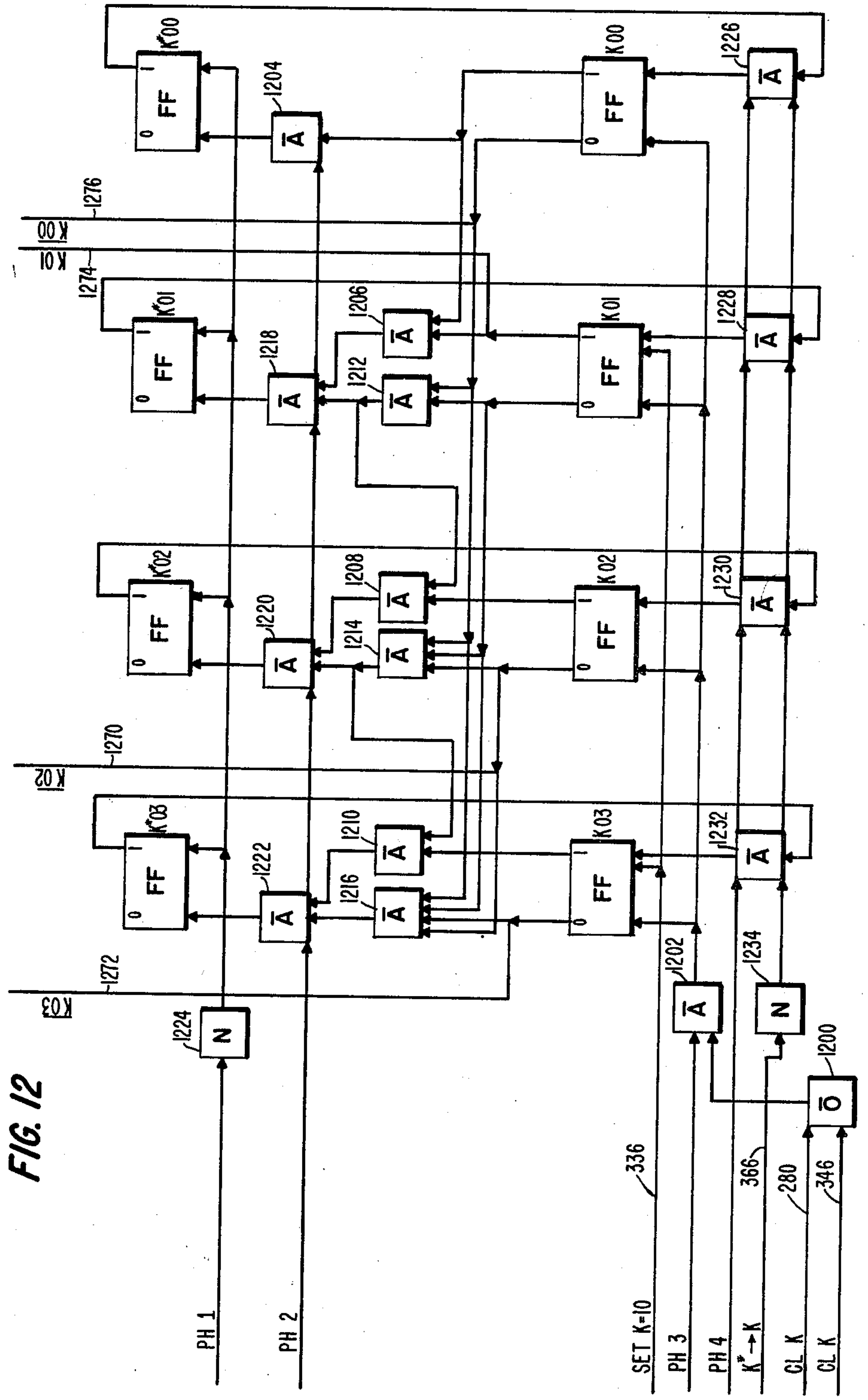

FIGURES 4*a* and 4*b* show the Q and Q* registers;

FIGURE 5 shows the first Q Sensor circuit;

FIGURE 6 shows the second Q Sensor circuit;

FIGURES 7*a–c* show the X, XS and X* registers and the gating circuits for controlling the transfer of data from X to XS and X*;

FIGURE 8 shows the A*B* half-subtractor and the first difference digit and borrow digit storage registers A* and B*;

FIGURES 9*a* and 9*b* show the AB half-subtractor and the second difference digit and borrow digit storage registers A and B;

FIGURES 10 and 11 show the first and second full subtractors, respectively;

FIGURE 12 shows the iteration counter; and

Figure 13B:
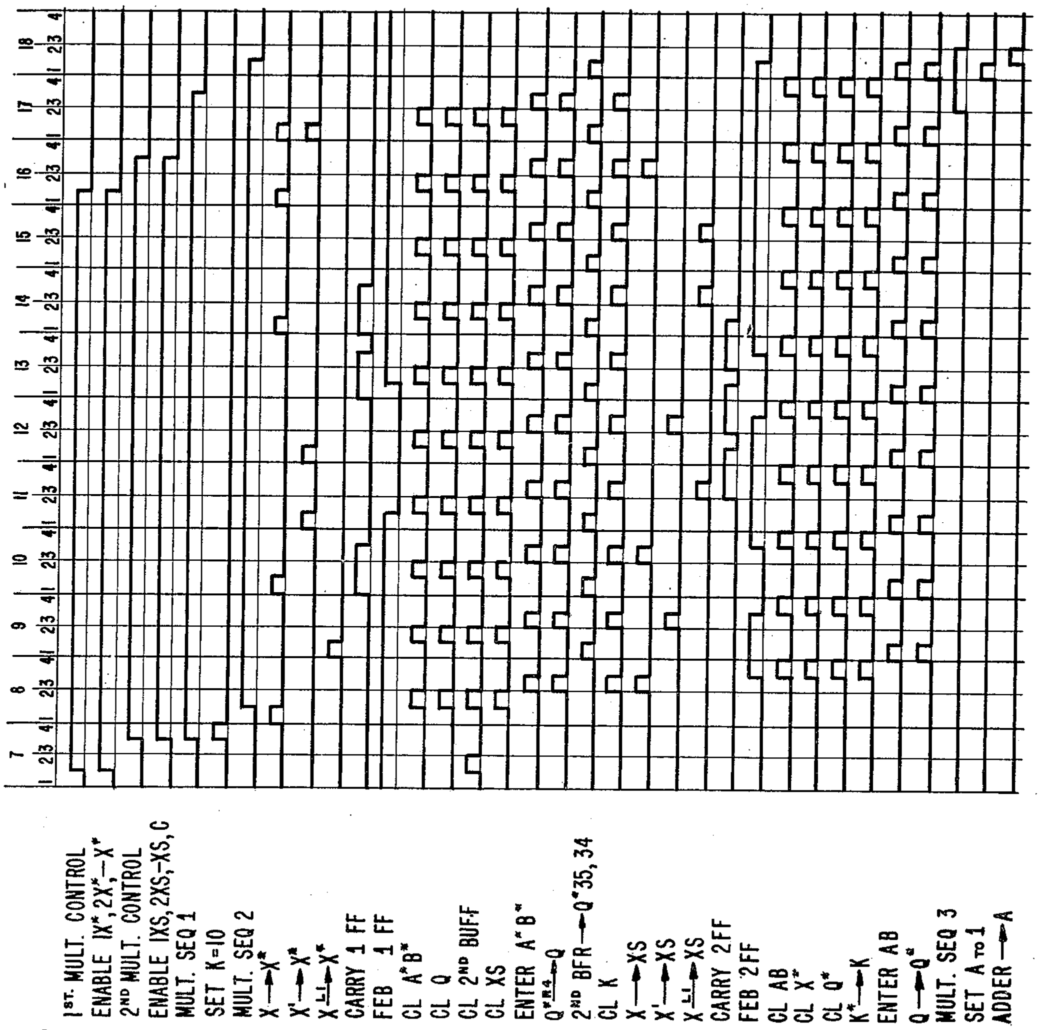
Figure 13A:
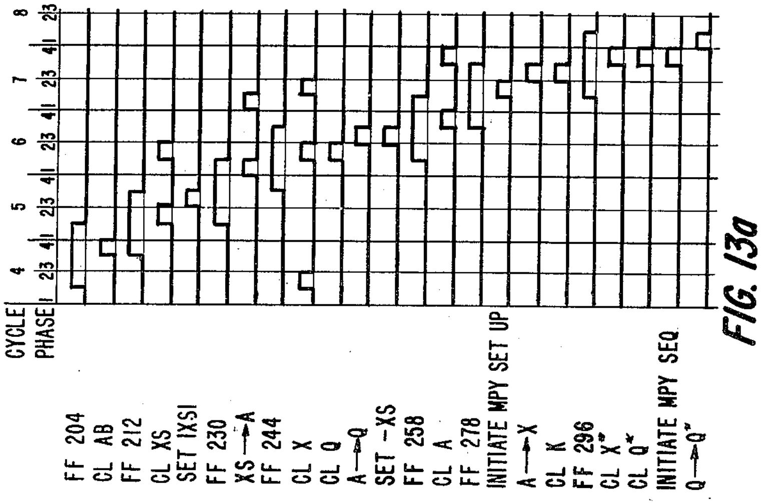

FIGURES 13*a* and 13*b* are timing diagrams illustrating the sequence of operation of the device during the set-up sequence and multiplication sequence, respectively.

DEFINITION OF SYMBOLS

In the accompanying drawings the symbols N, $\overline{O}$, $\overline{A}$ and FF are used to designate circuit components. The symbol N designates a circuit for performing the logical NOT function. The NOT circuit performs a signal inversion and may be an inverter of known design.

The symbol $\overline{O}$ designates a circuit for performing the negative OR function. The negative OR circuits may be inverters having two or more input leads and a single output lead. A negative OR circuit produces a negative output signal only when one or more of its inputs is positive.

The symbol $\overline{A}$ designates a circuit for performing the negative AND function. The negative AND circuit produces a positive output signal only when all of its inputs are negative. The negative AND circuits may be of the same construction as the negative OR circuit, the distinction being merely a matter of logical definition.

The symbol FF designates a bistable flip-flop. Such flip-flops are well known in the art and may, for example, comprise two negative OR circuits as described above each having its output connected to an input of the other.

As an aid in locating the source of control signals the following convention is employed. The elements or leads in FIGURES 2 through 12 have been assigned three digit reference numerals. The first of these digits represents the figure on which the element appears or, in the case of a control lead it indicates the figure on which the lead originates. There is one exception to this convention. The leads shown in phantom line each has a "1" as the first digit of the reference numeral. These control leads originate from circuits not shown herein and not employed in the multiply operation hence they are not mentioned in the following description.

GENERAL DESCRIPTION

Figure 1:
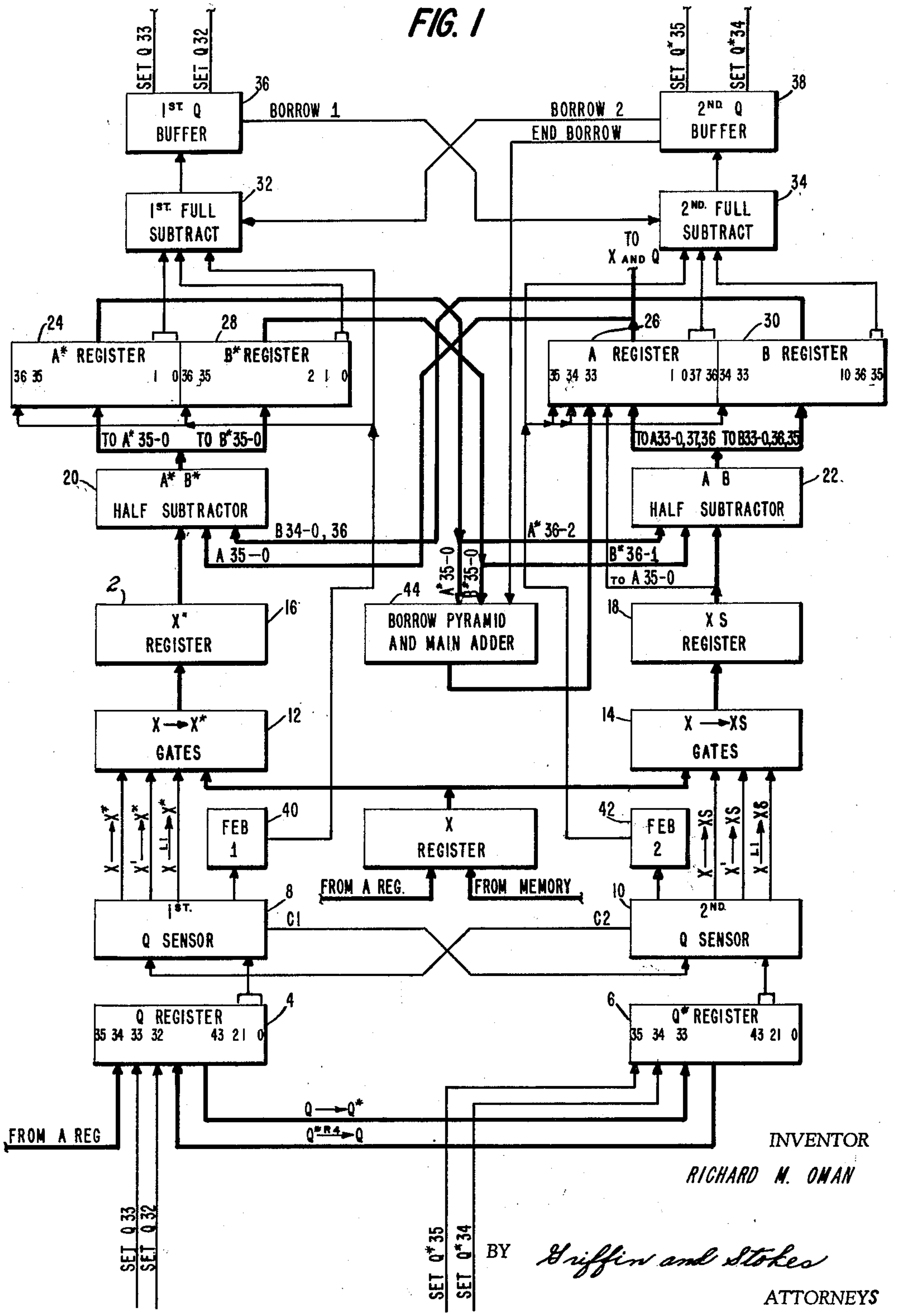
FIGURE 1 is a block diagram of the invention showing the main data transfer paths.

Referring now to FIGURE 1 the present invention comprises a multiplicand storage register 2, multiplier-product storage registers 4 and 6, first and second multiplier digit sensing circuits 8 and 10, first and second multiplicand gating circuits 12 and 14, first and second partial product storage registers 16 and 18, first and second half-subtractors 20 and 22, first and second difference digit storage registers 24 and 26, first and second borrow digit storage registers 28 and 30, first and second full subtractors 32 and 34, first and second buffer storage registers 36 and 38, first and second forced end borrow circuits 40 and 42, and a main adder and borrow pyramid 44.

Figure 2:
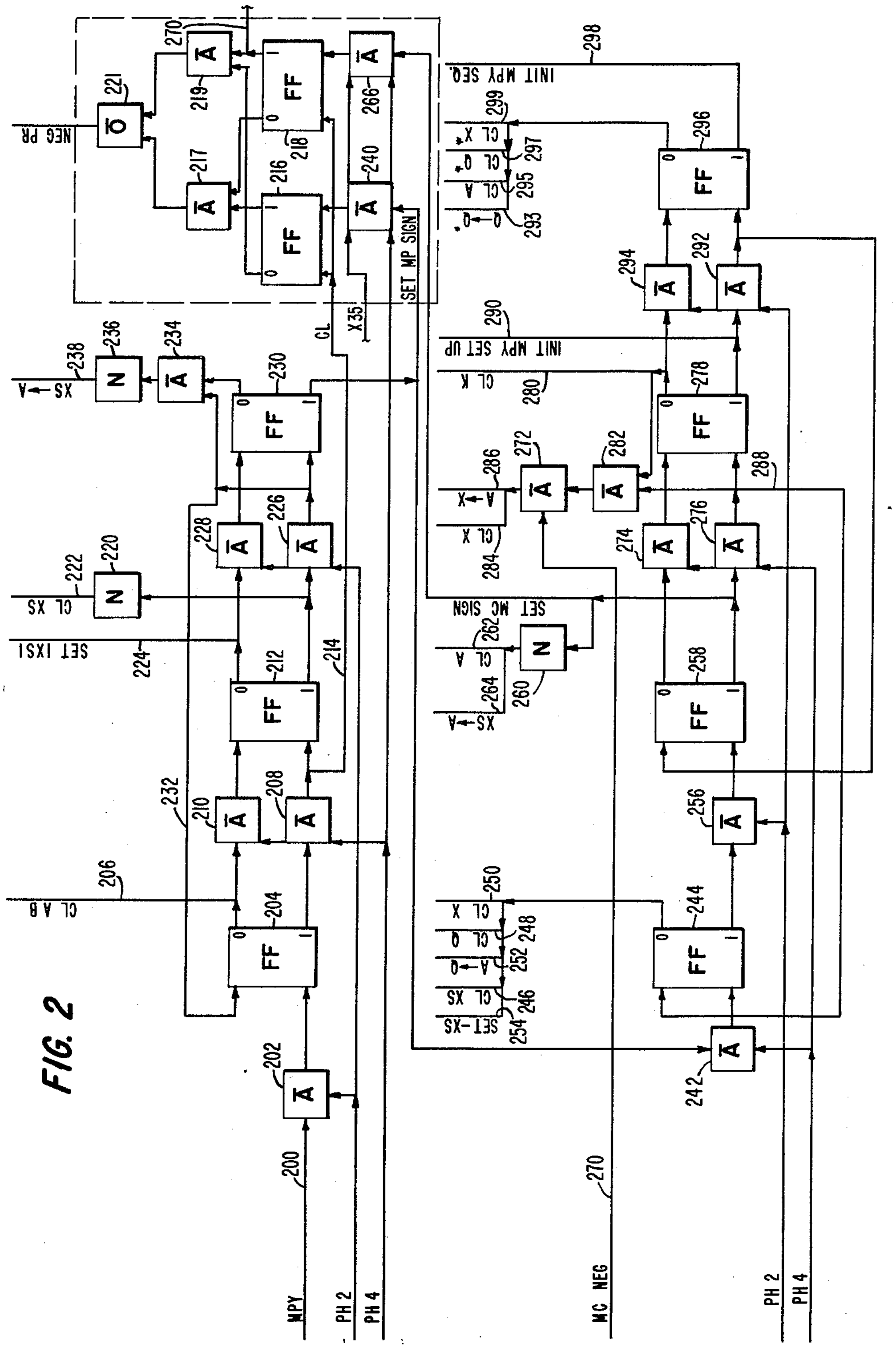
FIGURE 2 shows the command generator for controlling the set-up sequence in which the operands are entered into the arithmetic unit in preparation for the multiplication operation.
Figure 3:
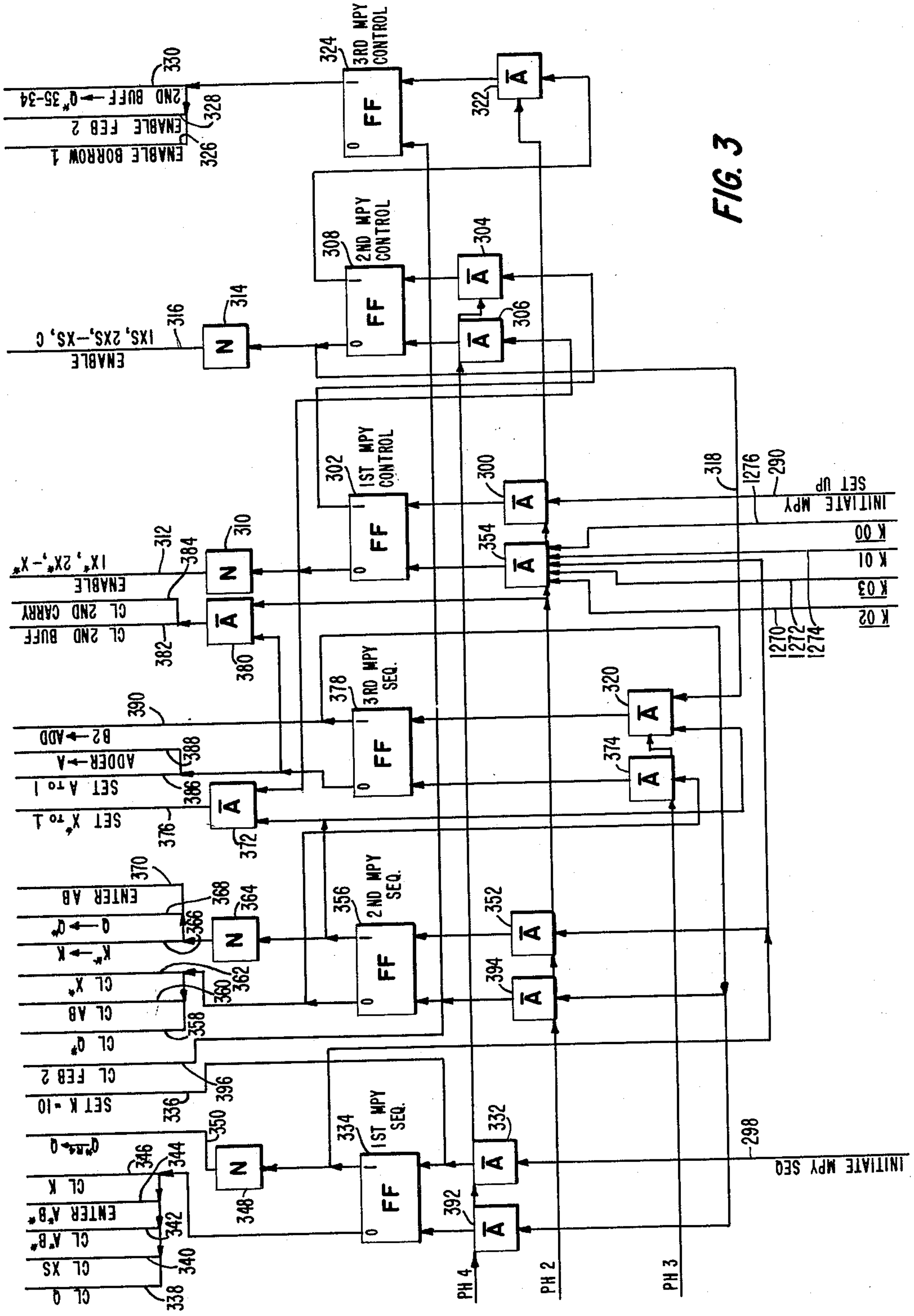
FIGURE 3 shows the command generator for controlling the sequence of iterative cycles followed by an end correction cycle.

The elements shown in FIGURE 1 are controlled by a Set-Up Sequence Control (shown in FIGURE 2) and a Multiply Sequence Control (shown in FIGURE 3).

The multiplier and multiplicand are entered into the arithmetic circuits through the X register with the multiplier being entered first. The Set-Up Sequence controls cause a positive multiplier to be transferred from the X register through the X to XS gates 14, the XS register 18, and the A register 26 to the Q register. The multiplier is also gated from Q to Q* without resetting the Q register so that the multiplier is stored in both the Q and Q* registers. If the multiplier is negative then the ones complement of the multiplier is gated from the X register to the XS register by the X to XS gates and the complement of the multiplier entered into the Q register from A and the Q* register from Q. An indication of the negative multiplier sign is stored in a manner subsequently described.

Next, the multiplicand is entered into the X register. It is always assumed that the sign of the multiplicand is negative so the Set-Up Sequence control causes the X to XS gates to transfer the complement of the multiplicand from the X register to the XS register. This complement value is then transferred from XS to A. The sign of the multiplicand is sensed from the sign position of the X register. If the sign is actually negative (represented by a binary 1 then the complement value from A is entered into X. If the sign is positive (represented by 0) then the complement value is cleared from the A register and the uncomplemented multiplicand is retained in the X register. And indication of the sign of the multiplicand is stored along with the sign of the multiplier so that the sign of the product may be produced therefrom after the multiply operation is complete. This sign indication is used in storing the product.

All of the above-described operations are controlled by the Set-Up Sequence Controls. After they have been completed the Set-Up Sequence Controls initiate the operation of the Multiply Sequence Controls. This completes the set-up sequence and all further commands are generated by the Multiply Sequence Controls. Thus, at the beginning of the multiply sequence the absolute value of the multiplicand is stored in the X register and the absolute value of the multiplier is stored in the Q and Q* registers.

The Multiply Sequence Control first sets the binary equivalent of decimal 10 into an Iteration Counter (shown in FIGURE 12). The specific embodiment described herein is designed to multiply two 36-bit numbers. For the general case of an N-bit multiplier the Iteration Counter is set to $N/4+1$. The Multiply Sequence Controls reduce the count in the counter by one each machine cycle and the Iteration Counter produces an output signal to stop the multiply operation when the count in the counter reaches zero. During this time the Multiply Sequence Controls control the circuits of FIGURE 1 to perform nine iterative cycles and an end correction cycle. In the embodiment shown a cycle comprises four phases each defined by a phase or clock pulse generated by a clock pulse generator of conventional design.

In multiplying binary numbers by sensing one multiplier digit at a time a plurality of iterative cycles are performed in which a single multiplier digit is sensed, zero or one times the multiplicand is added depending upon whether the multiplier digit is zero or one, and the accumulated partial product shifted one binary order. This operation is illustrated as follows:

```
0000
0111    =1st partial product
----
0111    =1st Accumulated partial product
00111   =1st Acc. PP shifted
0111    =2nd PP
----
10101   =2nd Acc. PP
010101  =2nd Acc. PP shifted          Mp=0111
0111    =3rd PP                       Mc =0111
------
110001  =3rd Acc. PP
0110001 =3rd Acc. PP shifted
0000    =4th PP
-------
0110001=product
```

*Example 1*

In sensing two multiplier digits at a time it is necessary to add in a partial product which may be zero, one, two or three times the multiplicand. Furthermore, the accumulated partial product must be shifted two binary orders to the right on each cycle. Using the same multiplier and multiplicand values given above this is illustrated as follows:

```
00000
10101   =1st PP
-----
10101   =1st Acc. PP
0010101=1st Acc. PP shifted
00111   =2nd PP                   Mp=00111
-------
0110001=product                   Mc =00111
```

*Example 2*

In this case the first pair of multiplier digits sensed are 11 which is the binary equivalent of three. Therefore, the first partial product is $3\times7=21$. The second pair of multiplier digits sensed are 01 hence $1\times7$ is the second partial product. Note that the results of the two examples are the same although the second example requires only two addition operations while the first requires four additions.

The second example illustrates the purpose of the Q Sensor circuits 8 and 10 shown in FIGURE 1. On each iterative cycle of the multiply operation the 1st Q Sensor senses the pair of multiplier digits in the two low order positions of the Q register and the 2nd Q Sensor senses the pair of multiplier digits in binary orders $2^2$ and $2^3$ of the Q* register. The Multiply Sequence Controls emit commands on each iterative cycle which cause Q to be transferred to Q* and then Q* transferred to Q with a shift of four binary orders to the right. Thus the 1st Q Sensor senses the low order pair of multiplier digits on the first iterative cycle and succeeding alternate higher order pairs on succeeding cycles. The 2nd Q Sensor senses the pairs of multiplier digits not sensed by the 1st Q Sensor, with one pair being sensed on each cycle.

In response to each pair of multiplier digits sensed by it, the 1st Q Sensor produces a signal which indicates whether zero, one, two or minus one times the multiplicand should be gated to the X* register as a partial product. In like manner, the 2nd Q Sensor responds to each pair of multiplier digits sensed by it and produces an indication of whether zero, one, two or minus one times the multiplicand should be gated from X to XS as a partial product.

In the example given above it was shown that when two multiplier digits are sensed at a time the partial product may be zero, one, two or three times the multiplicand. The present device does not include means for forming three times the multiplicand but it does include gating means 12 and 14 for gating zero, one, two or minus one times the multiplicand from the X register to either X* or XS. Therefore, in the present invention the equivalent of three times the multiplicand is obtained by subtracting one times the multiplicand from the accumulated partial product, shifting the new accumulated partial product four binary orders to the right and then adding one times the multiplicand on the next addition. Consider the following example for forming three times a multiplicand having a value of seven.

```
  1000      1's complement of Mc
  111000    1's comp. shifted 2 places (sign extended)
  0111      1 times Mc
  ------
[1]010100
 |
 └──→ 1     End around carry
  ------
  010101    Product
```

*Example 3*

In this example the ones complement of the multiplicand is formed, the ones complement shifted two binary orders to the right and then one times the multiplicand is added to the shifted ones complement. Of course, adding the complement of a number is equivalent to subtracting the uncomplemented value of the number. Note that the sign of the complemented value is extended into the positions from which the complement value is shifted. Note further that the addition produces a carry from the highest order which must be added into the low order of the result. These features are discussed subsequently.

Turning now to Example 4, the function of the Q Sensor becomes evident. The two multiplier digits sensed by the 1st Q Sensor are 11 thus requiring that minus one times the multiplicand be added as the first partial product and one times the multiplicand be carried over and added as the next partial product. However, the 2nd Q Sensor senses the pair of multiplier digits 01 to determine the next partial product which according to the multiplier digits 01 should be one times the multiplicand. Therefore, in order to obtain the correct partial product the 2nd Q Sensor should emit a signal to cause two times the multiplicand in X to be transferred to XS as the partial product, one times the multiplicand to take care of the digits 01 and one times the multiplicand to take care of the carry over from the preceding sensing operation. Using the values of Example 3 the operation is performed as follows:

```
     0000
     1000     1X=1st PP                              Mp=0111
    ------
     1000     1st Acc. PP                            Mc=0111
   111000     1st Acc. PP shifted (sign extended)
     1110     2X=2nd PP
    ------
[1] 110000
 |
 +-----> 1    End around carry
    ------
   110001     49=product
```

*Example 4*

From the above description it is seen that the 1st Q Sensor receives pairs of multiplier digits from Q and carry signals C2 from the 2nd Q Sensor and emits one of the signals X to X*, X′ to X* or X to X* (L1) indicating that the partial product is 1X, −1X or 2X. If the partial product is 0X then none of these signals are emitted. The signals emitted by the 1st Q Sensor control the X to X* gates 12 to transfer the value in X to X*, the complement of the value in X to X*, or the value in X to X* with a shift of one binary order to the left. In addition, the 1st Q Sensor emits a carry signal C1 to the 2nd Q Sensor each time the partial product is determined to be minus one times the multiplicand.

There is a further condition under which the 1st Q Sensor should emit the carry signal C1. Consider the case of a multiplier having the value 001111. The low order pair of multiplier digits are 11 thus requiring that minus one times the multiplicand be subtracted and a carry signal generated to cause one times the multiplicand to be added on the next cycle. However, the next pair of multiplier digits are also 11. When the carry is added to 11 it produces a sum of four thus indicating that four times the multiplicand should be formed as the second partial product. The present invention cannot form four times the multiplicand directly but can obtain the same result by adding zero times the multiplicand on one cycle and then adding one times the multiplicand on the next cycle after the accumulated partial product has been shifted to the right two binary orders. Therefore, when the second pair of multiplier digits are sensed and found to be 11 and there is a carry from the preceding sensing operation the Q Sensor does not gate the multiplicand to one of the partial product registers but merely generates a carry signal which is taken into account on the next sensing operation. For the case where the multiplier is 001111 three sensing operations are performed which cause three partial products to be formed. These partial products are minus one times the multiplicand (two low order digits are 11), zero times the multiplicand (next pair of digits are 11 and there is a carry from the first sensing operation) and one times the multiplicand (next pair of digits are 00 and there is a carry from the second sensing operation).

This is a further condition under which four times the multiplicand must be obtained. Consider the case where the multiplier has a value 001011. In this case the three partial products formed are minus one times the multiplicand (two low order digits are 11), minus one times the multiplicand (next pair of multiplier digits are 10 and there is a carry from the first sensing operation) and one times the multiplicand (next of digits are 00 and there is a carry from the second sensing operation).

In like manner, the 2nd Q Sensor receives pairs of multiplier digits from Q* and carry signals C1 from the 1st Q Sensor and emits one of the signals X to XS, X′ to XS or X to XS (L1) indicating that the partial product is 1X, −1X or 2X. If the partial product is 0X then none of these signals are emitted. The signals emitted by the 2nd Q Sensor control the X to XS gates 14 to transfer the value in X to XS, the complement of the value in X to XS, or the value in X to XS with a shift of one binary order to the left.

The partial products gated to X* and XS in response to signals from the 1st and 2d Q Sensors are alternately added to the accumulated partial product by the A*B* and AB half-subtractors.

The accumulated partial product represented by difference digits and borrow digits in the A and B registers is continuously applied to the A*B* half-subtractor. The partial product in X* is also continuously applied to the A*B* half-subtractor. On phase 3 of each cycle the result is gated from the half-subtractor into the difference digit storage register A* and the borrow digit storage register B*. The A*B* half-subtractor actually performs a half-add operation but because its logic is subtractive it is referred to as a half-subtractor. It half-subtracts the complement of the value in X* from the value in A and then half-subtracts the borrows in B from this result. The accumulated partial product developed by the half-subtractor is a series of difference digits and a series of borrow digits which are entered into the A* and B* registers, respectively.

The accumulated partial product in A* and B* is continuously applied to the AB half-subtractor which operates in the same manner as the A*B* half-subtractor. The partial product in XS is also continuously applied to the AB half-subtractor. On phase 1 of each cycle the result is gated from the half-subtractor into the difference digit storage register A and the borrow digit storage register B. It is seen therefore that on one iterative cycle two half-subtract operations are performed, one by the A*B* half-subtractor at phase 3 and another by the AB half-subtractor at phase 1.

If the difference digits and borrow digits were added after each half-subtract operation to obtain a true binary representation of the accumulated partial product considerable time would have to be allowed for propagation of the borrows. The present invention avoids this loss of time by propagating the borrows to the left only one binary order and adding them in at the time the next partial product is added. The propagation to the left may be accomplished on the transfer from B* to the AB half-subtractor and on the transfer from B to the A*B* half-subtractor and requires no additional time.

Table I shows the pattern of inputs to the binary orders of the AB half-subtractor and Table II shows the pattern of inputs to the A*B* half-subtractor.

TABLE I

| | | | | | | | | | | | |
|---|---|---|---|---|---|---|---|---|---|---|---|
| AB Half-Subtractor | 35 | 34 | 33 | 32 | ------ | 5 | 4 | 3 | 2 | 1 | 0 |
| A* | 33 | 36 | 35 | 34 | ------ | 7 | 6 | 5 | 4 | 3 | 2 |
| B* | 36 | 35 | 34 | 33 | ------ | 6 | 5 | 4 | 3 | 2 | 1 |
| XS | 35 | 34 | 33 | 32 | ------ | 5 | 4 | 3 | 2 | 1 | 0 |
| A | 33 | 32 | 31 | 30 | ------ | 3 | 2 | 1 | 0 | 37 | 36 |
| B | 33 | 32 | 31 | 30 | ------ | 3 | 2 | 1 | 0 | 36 | 35 |

TABLE II

| | | | | | | | | | | | |
|---|---|---|---|---|---|---|---|---|---|---|---|
| A*B* Half-Subtractor | 35 | 34 | 33 | 32 | ------ | 5 | 4 | 3 | 2 | 1 | 0 |
| A | 35 | 34 | 33 | 32 | ------ | 5 | 4 | 3 | 2 | 1 | 0 |
| B | 34 | 33 | 32 | 31 | ------ | 4 | 3 | 2 | 1 | 0 | 36 |
| X* | 35 | 34 | 33 | 32 | ------ | 5 | 4 | 3 | 2 | 1 | 0 |
| A* | 35 | 34 | 33 | 32 | ------ | 5 | 4 | 3 | 2 | 1 | 0 |
| B* | 35 | 34 | 33 | 32 | ------ | 5 | 4 | 3 | 2 | 1 | 0 |

Table I shows that the difference digits of an accumulated partial product in A* are applied to the AB half-subtractor with a shift of two binary orders to the right while the partial product in XS is applied to the half-subtractor without shift. This accomplishes the right shift of the accumulated partial products after they are developed by the A*B* half-subtractor. In addition, Table I shows that the borrow digits of an accumulated partial product in B* are applied to the AB half-subtractor with a shift of one binary order to the right. Since A* is shifted right two orders during the transfer and B* is shifted right only one order it is seen that the net effect is that B* is shifted left one order with respect to A*. This propagates the borrows in B* one order to the left.

Table I also shows that the output of the AB half-subtractor is applied to the A and B registers with a shift of two binary orders to the right thus accomplishing during each iterative cycle the second right shift of the accumulated partial product. From Table II it is seen that each stage of X* and A is applied to the corresponding stage of the A*B* half-subtractor. The borrow digits of the accumulated partial products developed by the AB half-subtractor are left shifted one binary order during the transfer from B to the A*B* half-subtractor. This propagates these borrows one binary order.

Table I also shows that A*36 is applied to both stages 35 and 34 of the AB half-subtractor while B*36 is applied to stage 35. Since A* is right shifted two binary orders and B* is right shifted one binary order on the transfer from A* and B* some provision must be made to extend the sign of the numbers. Consider the negative value −16. It is represented in binary ones complement form as 101111 is stored in a six digit register. Assume that the register is right shifted two places and the low order digits lost. Without sign extension the register contains the value 001011=11. Since a shift of two binary orders to the right is equivalent to dividing by 4 it is obvious that the result is incorrect without sign extension. If the sign digit is extended into the register positions left blank by the shift the result is 111011=−4. This is the correct result since −16/4=−4.

It can be shown that the sign of the result obtained by adding a partial product of minus one times the multiplicand to an accumulated partial product which has been shifted two orders to the right is always plus. Alternatively, the sign of the result is minus if the partial product is zero or a positive multiple of the multiplicand. Since the Q Sensor circuits determine whether some multiple of the multiplicand is to be added to the accumulated partial product or one times the multiplicand is to be subtracted, it is possible to use these circuits for determining the sign.

The 1st Q Sensor is connected to the Forced End Borrow circuit 40 and conditions this circuit each time it is determined that zero or a positive multiple of the multiplicand is to be added to the accumulated partial product in the A*B* half-subtractor. The output from the Forced End Borrow circuit is applied to A*36 and B*36 to store the anticipated negative sign of the result.

In like manner, the 2nd Q Sensor conditions Forced End Borrow circuit 42 each time the 2nd Q Sensor determines that zero or a positive multiple of the multiplicand is to be added to the accumulated partial product in the AB half-subtractor. The output from FEB2 is entered into A35, A34 and B34, these positions otherwise being empty because of the right shift when transferring from the AB half-subtractor to the A and B registers.

The FEB1 and FEB2 circuits also apply forced end around borrow signals to the full subtractors 32 and 34, respectively.

Note that when the accumulated partial product difference digits in A* are right shifted on the transfer to the AB half-subtractor the two low order digits A*01 and A*00 are lost. These two digits represent two digits of the product before certain borrows are subtracted therefrom.

Full subtractor 32 receives these digits and subtracts the appropriate borrows therefrom to develop two product digits and a borrow digit on each iterative cycle. The product digits are entered into the 1st Q Buffer 36 and when Q* is transferred to Q with a right shift of four binary orders the digits in the 1st Q Buffer are entered into Q33 and Q32 which are otherwise left blank because of the shift. The borrow digit B1 is applied to the full-subtractor 34.

The borrows subtracted from A*01 and A*00 are the borrow in B*00, the FEB1, and the Borrow 2 from the 2nd Q Buffer. The borrow in B*00 is left shifted one position and subtracted from A*01. The FEB1 and the Borrow 2 are both subtracted from the low order value A*00.

The FEB1 signal is the same as the sign signal since it can be shown that with a subtractive accumulator an end around borrow is necessary each time the partial product is zero, one or two times the multiplicand and no end around borrow is necessary when the partial product is minus one times the multiplicand. It should be noted that since the A*B* half-subtractor performs a half-subtract rather than a full subtract it is necessary to anticipate the end around borrow by sensing the output from the Q Sensor and setting the FEB1 circuit when the partial product is to be any value other than minus one times the multiplicand.

The Borrow 2 signal may best be explained by first considering the following example of the operation of the full subtractor 32. Assume that A*01 and Borrow 2 are both zero and A*00, B*00 and FEB1 are all ones

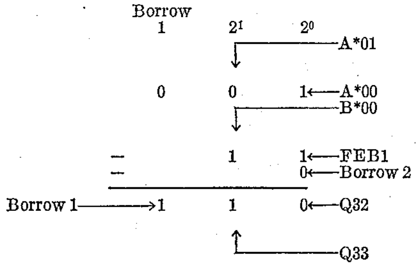

*Example 5*

The FEB1 and Borrow 2 signals are subtracted from A*00 giving a zero output from the low order position of the subtractor. This value enters the low order of the 1st Q Buffer for subsequent transfer to Q32. B*00 is subtracted from A*01. This produces a one which enters the high order of the 1st Q Buffer for subsequent transfer to Q33. The subtraction of B*00 from A*01 results in a Borrow 1 signal indicating that the total value in A*01 and A*00 is less than the total value of the borrows subtracted therefrom. The Borrow 1 signal is then applied to the full subtractor 34 and subtracted from the low order thereof when the next pair of product digits are formed.

The full subtractor 34 alternates with subtractor 32 in producing pairs of product digits. The subtractor 34 senses A37, A36 and B35 which are the low order digits lost in the transfer from the A and B registers to the A*B* half-subtractor. The subtractor subtracts B35 from A37. In addition, subtractor 34 subtracts the FEB2 and Borrow 1 signals from A36. The result is a pair of product digits and a Borrow 2 signal which are entered into the 2nd Q Buffer 38. The product digits are then transferred into Q*35 and Q*34 at the time the Q register is transferred to Q*. The Borrow 2 signal is applied to the full subtractor 32 at the time this subtractor forms the next pair of product digits.

In summary, on each iterative cycle the 1st Q Sensor senses two multiplier digits from Q00 and Q01 and a Carry 2 signal from the 2nd Q Sensor and controls the transfer of some multiple of the multiplicand from X to X* as a partial product. The A*B* half-subtractor half-adds the partial product to the accumulated partial product applied to it from the A and B registers. The resulting accumulated partial product is exhibited as a series of difference digits and a series of borrow digits in the A* and B* registers. The first full subtractor is responsive to the two low order difference digits and certain borrow signals and generates two product digits which are stored in the 1st Q Buffer.

On each iterative cycle the 2nd Q Sensor senses two multiplier digits from Q*02 and Q*03 and a Carry 1 signal from the 1st Q Sensor and controls the transfer of some multiple of the multiplicand from X to XS as a partial product. The AB half-subtractor half-adds the partial product to the accumulated partial product applied to it from the A* and B* registers. The resulting accumulated partial product is exhibited as a series of difference digits and a series of borrow digits in the A and B registers. The second full subtractor is responsive to the two low order difference digits and certain borrow signals and generates two product digits which are stored in the 2nd Q Buffer.

On each iterative cycle the Q* register is transferred to Q with a right shift of four binary orders and the two product digits in the 1st Q Buffer are entered into Q33 and Q32. On each iterative cycle the value in Q is transferred to Q* without shift and at this time the product digits in the 2nd Q Buffer are entered into Q*35 and Q*34.

After nine iterative cycles have been completed all thirty-six multiplier digits have been sensed and thirty-six product digits have been formed. At this time the final accumulated partial product is stored as a series of difference digits and borrow digits in the A and B registers. The Multiply Sequence Controls subsequently described cause A and B to be transferred to the A*B* half-subtractor where they are half-added to a negative zero value from X*. The result enters the A* and B* registers and is applied to the Borrow Pyramid and Main Adder 44. The borrows in B* are propagated to the left and end around and half-added to the difference digits from A* to produce a true binary indication of the sign and thirty-five high order digits of the product. It should be noted at this point that the second full subtractor may produce a borrow as the last pair of product digits are formed on the last iterative cycle. This borrow is applied to the borrow pyramid as an end-around borrow. In the final step of the end correction cycle the thirty-six high order digits of the product are transferred from the Main Adder to the A register. The thirty-six low order product digits are in the Q* register.

SET-UP SEQUENCE CONTROLS

The present invention is adapted for use in a data processing system wherein instructions are executed during a plurality of machine cycles each having four phases. The phases occur sequentially and are timed by clock or phase pulses 1 through 4. The source of the phase pulses is not shown herein but may be any suitable clock pulse generator of the prior art which produces a sequence of negative pulses. For purposes of the present explanation it is assumed that the multiply operation begins during the fourth machine cycle with the preceding machine cycles being taken up by the main computer controls in decoding the multiply instruction and performing the usual housekeeping operations.

The Set-Up Sequence Controls are first activated when the command Multiply appears on lead 200 of FIGURE 2. This initiates the operation of the set-up sequence control circuits of FIGURE 2 which control the transfer of the multiplier and multiplicand into the arithmetic circuits, check the operand for signs, and perform the necessary complementing operations if the signs are negative. After these operations are performed the Set-Up Sequence Control circuits initiate operation of the Multiply Sequence Controls. FIGURE 13*a* is a timing diagram illustrating the sequence of signals produced during the set-up sequence. The timing chart is not intended to represent the polarity of signals but merely represents the time the signals are effective.

The command Multiply appears on lead 200 during cycle 4 and is applied to $\overline{\text{A}}$202. A phase 2 pulse conditions the second input of $\overline{\text{A}}$202 and at time 42 (cycle 4, phase 2) $\overline{\text{A}}$202 produces a positive output signal which is applied to the set input of flip-flop 204. The positive output from the reset side of FF204 is applied over lead 206 to the A and B registers where it is mixed with a phase 4 pulse to clear these registers at time 44. The set and reset outputs of FF204 are applied to $\overline{\text{A}}$208 and $\overline{\text{A}}$210, respectively. Both of these gates are conditioned by a phase 4 pulse and at time 44 $\overline{\text{A}}$208 produces a positive output signal to set flip-flop 212. The output of $\overline{\text{A}}$208 is also applied over lead 214 to the reset inputs of the multiplier and multiplicand sign storage flip-flops 216 and 218. The output off the set side of FF212 is inverted at N220 to become the command Clear XS. This command is applied over the lead 222 to the 2nd Q Sensor circuits where it is mixed with a phase 2 pulse and applied to the reset inputs of the Q Sensor flip-flops. The positive output off the reset side of FF212 is applied by way of lead 224 to the 2nd Q Sensor circuits where it is mixed with an indication of the sign of the multiplier. If the multiplier is negative, the 2nd Q Sensor circuits control the X to XS gating circuits to gate the complement of the multiplier from the X register to XS. On the other hand, if the multiplier is positive the 2nd Q Sensor circuits control the X to XS gating circuits to transfer the true value of the multiplier from the X register to XS.

The set and reset output terminals of FF212 are connected to input terminals of $\overline{\text{A}}$226 and 228, respectively. These gates are further conditioned by a phase 2 pulse so at time $\overline{\text{A}}$226 generates a positive output signal to set FF230. The output of $\overline{\text{A}}$226 is also applied over lead 232 to the reset input of flip-flop 204 thus resetting this flip-flop at time 52.

When flip-flop 204 is reset at time 52 it conditions one input of $\overline{\text{A}}$210 and at time 54 $\overline{\text{A}}$210 produces a positive output signal to reset FF212. When FF212 is reset at time 54 the negative signal off the reset side conditions one input of $\overline{\text{A}}$228. At time 62, $\overline{\text{A}}$228 receives a phase 2 signal and thus produces a positive output signal to reset FF230.

As stated above, FF230 is set at the beginning of time 52 and is reset at the end of time 61. During this time, the positive output from the reset side of the flip-flop passes through $\overline{\text{O}}$234 and N236 and is applied to the A register over the lead 238. This command is mixed with a phase 1 signal to gate the content of XS, the multiplier, to the A register.

When FF230 is set at time 52, it conditions one input of $\overline{\text{A}}$240. This gate is further conditioned at this time by the value in X35 which is the sign of the multiplier. At time 54 the clock pulse conditions the third input of $\overline{\text{A}}$240 and it produces a positive output signal to set the multiplier sign flip-flop 216 if X35 contains a 1 thus indicating a negative multiplier.

The output from the set side of FF230 is also applied to one input of $\overline{\text{A}}$242. This gate is further conditioned by a phase 4 clock pulse and at time 54 it produces a positive output signal to set FF244. When FF244 is set, it produces the commands Clear XS, Clear Q, Clear X, A to Q, and Set −XS on the leads 246, 248, 250, 252 and 254, respectively. The Clear XS command is applied to the 2nd Q Sensor circuits and mixed with a phase 2 pulse to clear the Q Sensor flip-flops at time 62. The Clear Q command is applied over lead 248 to the Q register where it is mixed with a phase 2 pulse to reset the flip-flops of the Q register. The Clear X command on lead 250 is applied to the X register where it is mixed with a phase 2 pulse to reset the flip-flops of the X register at time 62. The command A to Q appearing on lead 252 is applied to the input gates of the Q register and at phase 3 of the 6th machine cycle gates the multiplier from A to Q.

The Set —XS command appearing on lead 254 is applied to the 2nd Q Sensor circuits to thus produce the controls necessary for gating the complement of the X register to XS. It should be noted at this point that the multiplicand is now contained in the X register having been entered therein at time 63. For sign control purposes and in order to save time it is assumed that the multiplicand has a negative sign. The Set-Up Sequence control generates the command Set —XS thus gating the complement of the multiplicand to XS. The Set-Up Sequence control subsequently generates the command XS to A to gate the complement of the multiplicand from XS to the A register. The sign of the multiplicand is then checked by the sign control circuits by sensing X35. If the sign of the multiplicand is negative the sign control circuits produce an output signal to control the Set-Up Sequence control to produce the command A to X which places the complement of the multiplicand in the X register. On the other hand, if the sign of the multiplicand is sampled and found to be positive, the sign control circuits do not produce the output signal which controls the multiply sequence timer to produce the A to X command. Thus the original or uncomplemented value of the multiplicand is contained in the X register. This is accomplished as follows.

The output from the set side of flip-flop 244 conditions one input of $\overline{A}$256. At time 62 a clock pulse passes through $\overline{A}$256 and sets flip-flop 258. The negative output off the set side of flip-flop 258 is inverted at N260 to become the commands Clear A and XS to A. The command Clear A is applied over lead 262 to the A register where it is mixed with a phase 4 clock pulse to reset the flip-flops of the A register at time 64. The command XS to A on lead 264 is applied to the input gates of the A register where it conditions these gates at time 71 to transfer the content of XS to A.

The output from the set side of flip-flop 258 also conditions $\overline{A}$266 which further receives a phase 4 clock pulse and an indication of the sign of the multiplicand stored in X35. If the sign of the multiplicand is negative, lead X35 is negative and at time 64 the multiplicand sign storage flip-flop 218 is set. When FF218 is set, lead 270 from the set output terminal becomes negative. This lead is connected to one input of $\overline{A}$272.

When FF258 is set at time 62, it blocks $\overline{A}$274 and conditions one input of $\overline{A}$276. These gates are sampled by a phase 4 pulse and at time 64 the output of 276 sets flip-flop 278. The positive signal from the reset side of FF278 becomes the command Clear K which is applied over the lead 280 to reset the flip-flops in the Iteration Counter. The output from the reset side of FF278 passes through $\overline{O}$282 and conditions one input of $\overline{A}$272. If the multiplicand has a negative sign lead 270 is negative and $\overline{A}$272 produces the commands Clear X and A to X on leads 284 and 286 to clear the multiplicand from the X register and enter the complement of the multiplicand therein from the A register.

The output signal from $\overline{A}$276 which sets FF278 at time 64 is also applied by way of lead 288 to the reset input of FF244 thus resetting this flip-flop.

The output from the set side of FF278 is applied over lead 290 to the Multiply Sequence Controls of FIGURE 3. This initiates the set-up of the circuits that control the multiply operation.

The set and reset outputs of FF278 are applied to $\overline{A}$292 and 294, respectively. These gates are further conditioned by phase 2 pulses and at time 72 $\overline{A}$292 produces a positive output signal to set FF296.

The negative signal off the set side of FF296 is applied by way of lead 298 to the Multiply Sequence Controls of FIGURE 3 to initiate the multiply sequence.

The positive signal off the reset side of FF296 becomes the commands Q to Q*, Clear A, Clear Q*, and Clear X*. The Clear Q* command is applied by way of lead 297 to the Q* register where it is mixed with a phase 4 pulse to reset the flip-flops of the Q* register at time 74. The Q to Q* command appearing on lead 293 is also applied to the Q* register and at time 81 conditions the input gates that allow the transfer of the multiplier from the Q register to Q*. This transfer places the multiplier in both the Q and Q* registers. The Clear A command appearing on lead 295 is applied to the A register where it is mixed with a phase 4 pulse to reset the flip-flops of the A register at time 74. The Clear X* command appearing on lead 299 is applied to the X* register where it is mixed with a phase 4 pulse to clear the flip-flops of the X* register at time 74.

The output signal from $\overline{A}$292 that sets FF296 is also applied to the reset input of flip-flop 258 thus resetting this flip-flop at the beginning of time 72. This conditions one input of $\overline{A}$274 and at the same time blocks $\overline{A}$276. At 74 time, a clock pulse passes through $\overline{A}$274 to reset FF278. This conditions one input of $\overline{A}$294 and blocks $\overline{A}$292. At time 82, a clock pulse passes through $\overline{A}$294 to reset FF296. This completes the operation of the Set-Up Sequence Control circuits with all the flip-flops being reset except the multiplier sign flip-flop 216 and the multiplicand sign flip-flop 218. The gate 217 is connected to the set output terminal of flip-flop 217 and the reset output terminal of flip-flop 218. The gate 219 is connected to the set output terminal of flip-flop 218 and the reset output terminal of flip-flop 216. The outputs of gates 217 and 219 are connected to $\overline{O}$221 which produces a negative output signal if the multiplier and multiplicand signs are not alike thus making the product negative. The output signal from $\overline{O}$221 is used to complement the product as it is transferred to memory from the multiplication circuits after the multiply operation has taken place.

MULTIPLY SEQUENCE CONTROLS

The multiply sequence control circuits are shown in FIGURE 3. These circuits generate the enabling commands which enable the various elements of the arithmetic unit to perform the multiplication operation. The timing diagram of FIGURE 13*b* will aid in understanding the following discussion. The timing diagram illustrates the time at which various commands resulting from operation of the Multiply Sequence Control are effective. The wave forms shown do not represent the polarity of the signals but merely show the time at which each command is effective.

As explained with reference to FIGURE 2, the command Initiate Multiply Set-Up is generated from time 64 through 73. This command is applied over the lead 290 to $\overline{A}$300. At phase 2 of the 7th cycle (time 72) a clock pulse samples $\overline{A}$300 and the gate produces a positive output signal to set the First Multiply Control flip-flop 302. The set and reset output terminals of FF302 are connected to inputs of $\overline{A}$304 and $\overline{A}$306, respectively. These gates are sampled at phase 4 by clock pulses and at time 74 $\overline{A}$304 produces an output signal to set the Second Multiply Control FF308.

When the First Multiply Control FF is set at time 72 the positive output off the reset side is inverted at N310 and applied over lead 312 to the 1st Q Sensor circuits. The command Enable 1X*, 2X*, —X* enables the 1st Q Sensor circuits so that they may sense the value of the multiplier digits in the two lower order stages of the Q register.

When the Second Multiply Control FF is set at time 74 the positive output off the reset side is inverted at N314 and applied over lead 316 to the 2nd Q Sensor circuits. The command Enable 1XS, 2XS, —1XS, C enables the 2nd Q Sensor circuits to sense the pair of multiplier digits stored in Q*02 and Q*03.

The output from the reset side of the Second Multiply Control FF is also applied by way of lead 318 to $\overline{A}$320 and blocks this gate as long as the flip-flop is set.

The output from the set side of the Second Multiply Control FF is applied to $\overline{A}$322. This gate also receives a phase 2 clock pulse on each cycle and at time 82 produces a positive output signal to set the Third Multiply Control FF324.

The output from the set side of the Third Multiply Control FF is applied over leads 326, 328 and 330 to the first full subtractor, the second forced end borrow circuit (FEB2), and the input gates to stages 34 and 35 of the Q* register, respectively.

The Set-Up Sequence controls generate the command Initiate Multiply Sequence on lead 298 from 72 through 81 time. This command is applied to $\overline{A}$332 which is sampled by a phase 4 pulse. At time 74 $\overline{A}$332 produces a positive output pulse to set the First Multiply Sequence FF334. At the same time the output of $\overline{A}$332 passes over lead 336 and is applied to the second and fourth stages of the Iteration Counter to set the count to the decimal value ten.

The output from the reset side of the First Multiply Sequence FF becomes the commands Clear Q, Clear XS, Clear A*B*, Enter A*B* and Clear K. The command Clear Q is applied over lead 338 to the Q register where it resets this register on phase 2 of each cycle in which the First Multiply Sequence FF is set. The command Clear XS is applied over lead 340 to the 2nd Q Sensor circuits where it resets the flip-flops of this circuit during phase 2 of each cycle. The command Clear A*B* is applied over lead 342 to the A* and B* registers where it clears these registers on phase 2 of each cycle. The command Enter A*B* is applied over lead 344 to the A*B* Half-Subtractor where it gates the result of the subtraction operation into A*B* on phase 3 of each cycle. The Command Clear K is applied over lead 346 to the K register where it resets the flip-flops in this register on phase 3 of each cycle.

The output from the set side of the First Multiply Sequence FF is inverted at N348 to become the command Q* to Q(R4). This command is applied over lead 350 to the input gates of the Q register to thus enable the transfer of the content of Q* into the Q register at phase 3 of each cycle.

The output from the set side of the First Multiply Sequence FF is also applied to $\overline{A}$352 and $\overline{A}$354. $\overline{A}$352 is further conditioned by a phase 2 pulse and at time 82 products an output signal to set the Second Multiply Sequence FF356.

The positive output from the reset side of the Second Multiply Sequence FF becomes the commands Clear Q*, Clear AB, and Clear X*. The command Clear Q* is applied over lead 358 to the Q* register where it enables the clearing of this register on phase 4 of each cycle. The command Clear AB is applied over lead 360 to the A and B registers where it enables the clearing of these registers on phase 4 of each cycle. The command Clear Q* is applied over lead 362 to the Q* register where it enables the clearing of this register at phase 4 of each cycle.

The output signal from the set side of the Second Multiply Sequence FF is inverted at N364 and becomes the commands K* to K, Q to Q* and Enter AB. The command K to K* is applied over lead 366 to the Iteration Counter where it enables the transfer of the contents of K* to K on phase 4 of each cycle. The command Q to Q* is applied over lead 368 to the transfer gates on the input of the Q* register to enable the transfer of the content of Q to Q* during phase 1 of each cycle. The command Enter AB is applied over lead 370 to transfer gates on the output of the Second Half-Subtractor to transfer the result of the half-add operation into A and B during phase 1 of each cycle.

The output from the set side of the Second Multiply Sequence FF is applied to $\overline{A}$372. The other input of $\overline{A}$372 is positive at this time because the First Multiply Control FF is set.

The outputs from the set and reset terminals of the Second Multiply Sequence FF are applied to $\overline{A}$320 and $\overline{A}$374, respectively. $\overline{A}$320 is blocked at this time because the Second Multiply Control FF is set and $\overline{A}$374 is blocked because of the positive output signal from the reset side of the Second Multiply Sequence FF.

After the Second Multiply Sequence FF is set at time 82 nothing further happens in the multiply control circuits of FIGURE 3 until the count in the Iteration Counter has been reduced to 2. During this interval the enabling commands generated by the Multiply Sequence Controls are timed by clock pulses and cause the arithmetic elements to cycle repeatedly through an iterative routine. During each of these iterative cycles the count in the Iteration Counter is reduced by one and at time 154 (cycle 15, phase 4) the Iteration Counter contains a count of 2. When the details of the Iteration Counter are explained it will become apparent that this condition is signalled by negative voltages on the leads 1270, 1272, 1274 and 1276. These leads are each connected to $\overline{A}$354. $\overline{A}$354 is further conditioned by the negative signal from the set side of the First Multiply Sequence FF. During phase 2 of the first cycle following the one in which the Iteration Counter reaches a count of 2 a clock pulse samples $\overline{A}$354 and the gate produces a positive output signal to reset the First Multiply Control FF. This disables the command Enable 1X*, 2X*, —X* on lead 312. The negative output from the reset side of the First Multiply Control FF passes through $\overline{A}$372 to become the command Set X* to 1. This command is applied over lead 376 to the 1st Q Sensor where it generates the command necessary for entering a negative zero value (all ones) into the X* register.

When the First Multiply Control FF is reset $\overline{A}$306 is conditioned and the gate passes the next following phase 4 pulse to reset the Second Multiply Control FF at time 164. This disables the command 1XS, 2XS, —XS, C appearing on lead 316. The negative output from the reset side of the Second Multiply Control FF is applied over lead 318 to $\overline{A}$320 which is further conditioned at this time because the Second Multiply Sequence FF is set. At time 173 a clock pulse samples $\overline{A}$320 and the output from this gate sets the Third Multiply Sequence FF378.

The positive output from the reset side of the Third Multiply Sequence FF blocks $\overline{A}$380 which has been producing the commands Clear 2nd Buffer and Clear 2nd Carry on the leads 382 and 384 at phase 2 of each cycle.

The positive output from the reset side of the Third Multiply Sequence FF becomes the commands set A to 1 and Adder to A. The command Set A to 1 is applied over lead 386 to the A register to set each of the flip-flops in this register. The command Adder to A is applied over the lead 388 to a set of output gates in the Main Adder to allow the transfer of the content of the Adder to the A register.

The negative signal off the set side of the Third Multiply Sequence FF is the command B2 to Adder. This command is applied to a gate on the output of the Borrow 2 FF (FIG. 11) and enables this gate to transfer to the Adder any borrow which may be stored in the Borrow 2 FF.

The set output of the Third Multiply Sequence FF is also applied to $\overline{A}$392 and $\overline{A}$394. $\overline{A}$392 is sampled by phase 4 clock pulses and at time 174 resets the First Multiply Sequence FF. $\overline{A}$394 is sampled by a phase 2 clock pulse and at time 182 produces a positive output to reset the Second Multiply Sequence FF and the Third Multiply Control FF. The output of $\bar{A}$394 also becomes the command Clear FEB2 which is applied over lead 396 to reset the FEB2 FF shown in FIGURE 6.

When the Second Multiply Sequence FF is reset the negative signal off the reset side conditions $\bar{A}$374 and at time 183 a phase 3 clock pulses passes through $\bar{A}$374 to reset the Third Multiply Sequence FF. At this point the multiplication operation has been completed and the six flip-flops of the Multiply Sequence Control have been reset.

Q AND Q* REGISTERS

The Q and Q* registers are shown in FIGURES 4*a* and 4*b*. The Q register is a 36-stage register with the stages being designated Q00 through Q35. Stages Q05 through Q30 are omitted from the drawing, these stages being identical to stage Q31. The Q register initially holds the multiplier but during the multiply operation the multiplier is shifted to the right and product digits entered into the register.

Each stage includes a flip-flop 400 having set and reset input terminals. Clear Q commands appear on the leads 248 and 338 and are applied to $\bar{O}$402. The output of 402 is applied to $\bar{A}$404 which also receives phase 2 clock pulses. Therefore, at time 62 of the set-up sequence and during phase 2 of cycles 8 through 17 $\bar{A}$404 produces a positive output signal that is applied to the reset input terminal of each of the flip-flops 400.

Information is entered into the Q register on phase 3 immediately after the flip-flops have been reset. This information may come from the A register, the Q register, or the 1st Q Buffer Register. During the set-up sequence the command A to Q appears on lead 252 and is inverted at N406 before being applied to $\bar{A}$408 in each stage of the Q register. The gate 408 in each stage of the Q register continuously receives information signals from the corresponding stage of the A register over a lead 410. These gates are further conditioned by phase 3 clock pulses appearing on lead 412 so at time 63 of the set-up sequence the multiplier is gated from the A register through the set of gates 408 to the Q register.

Information may also be transferred from the Q* register to the Q register with a shift of four binary orders to the right. For this purpose stages Q00 through Q31 are each provided with a gate 414 having its input connected to a lead 418 which comes from the fourth binary order to the left in Q* and its output connected to the set input of the flip-flop 400. The gates 414 are also conditioned by the phase 3 pulse appearing on lead 412 and by the output signal from N416. N416 receives the command Q* to Q(R4) continuously from cycle 7 phase 4 through cycle 17 phase 3. Therefore, at phase 3 of cycles 8 through 17 the gates 414 are conditioned to gate the information from Q* into the Q register with a shift of four binary orders to the right.

Stages Q32 and Q33 receive two of the product digits developed during each iterative cycle of the multiply operation. These digits appear on the leads Set Q33 and Set Q32 from the 1st Q Buffer and are applied to $\bar{A}$420 and $\bar{A}$422, respectively. The output of 420 is connected to the flip-flop 400 of stage Q33 and the output of $\bar{A}$422 is connected to the flip-flop 400 of stage Q32. The gates 420 and 422 are also conditioned by the output of N416 and phase 3 clock pulses. Therefore, each time information is transferred from Q* to Q with a right shift of four binary orders two product bits are entered into the stages Q32 and Q33 left blank by the shift operation.

Information in the Q register may be transferred to the Q* register without shift. The output from the set side of each stage of the Q register is connected to one input of a transfer gate $\bar{A}$424. The output from each gate 424 is applied to the set input terminal of the corresponding stage of the Q* register. The command Q to Q* appears on lead 293 during the set-up sequence and on the lead 368 during the multiply sequence. This command is inverted at $\bar{O}$426 and applied to one input of each of the gates 424. The gates 424 are further conditioned by phase 1 pulses so during phase 1 of cycles 8 through 18 these gates are conditioned to transfer information from each stage of the Q register into the corresponding stage of the Q* register.

The Q* register also comprises thirty-six binary stages. Each stage includes a flip-flop 428 which may be set in response to the output of a gate 424 if the corresponding stage of the Q* register contains a binary 1 at the time the command Q to Q* appears. The command Clear Q* appears on lead 297 during the set-up sequence and on lead 358 during the multiply sequence. This command is inverted at $\bar{O}$430 and applied to one input of $\bar{A}$432. $\bar{A}$432 is further conditioned by phase 4 pulses. The output of $\bar{A}$432 is applied to the reset input of each of the flip-flops 428. Therefore, the flip-flop in each stage of the Q* register is cleared during phase 4 of cycles 7 through 17. Since information is entered into Q* only during phase 1 of cycles 8 through 18 it is seen that each stage of the Q* register is cleared immediately before information is transferred into it.

Stages 34 and 35 of the Q* register contain a pair of gates $\bar{A}$434 and $\bar{A}$436 not present in other stages of the register. The two product digits developed by the first full subtractor and entered into the 2nd Q buffer appear on the leads Set Q*34 and Set Q*35 as long as the product digits are present in the 2nd Q buffer. The high order digit of the pair is applied to $\bar{A}$434 and the low order digit of the pair is applied to $\bar{A}$436. These gates are further conditioned by the command 2nd Buffer to Q*35–34 appearing on lead 330 and phase 1 pulses appearing on lead 440. Therefore, during phase 1 of cycles 9 through 18 the two product digits stored in the 2nd Q Buffer register are entered into stages 34 and 35 of Q* at the same time the value in Q is transferred to Q*.

It should be noted that each transfer from Q* to Q is made with a right shift of four binary orders thus leaving stages Q32 through Q35 empty. Two product digits are entered into stages Q32 and Q33 at the time the transfer from Q* to Q is made. This leaves only stages Q34 and Q35 empty. A transfer from Q to Q* at this time leaves stages Q*34 and Q*35 empty. These stages are filled with two product digits received from the 2nd Q Buffer. In summary, during each iterative cycle of the multiply operation Q* is transferred to Q with a right shift of four places and two product digits entered into Q33 and Q32. Q is then transferred to Q* and two more product digits entered into Q*35 and Q*34 at this time.

The multiplier is initially contained in the Q and Q* registers and is shifted to the right during the multiply operation as product digits are entered into the higher order stages of the two registers. Four multiplier digits are sensed on each iterative cycle. The lower order pair of digits is sensed while the multiplier is in the Q register and the higher order pair of digits is sensed after the multiplier is transferred from Q to Q*. The leads 442, 444, 446 and 448 are connected to the output terminals of the two low order stages of the Q register for the purpose of applying to the first Q Sensor circuit of FIGURE 5 an indication of the binary values contained in these stages. The leads 450, 452, 454 and 456 are connected to the outputs of stages Q*03 and Q*02 and apply indications of the values stored in these stages to the second Q Sensor circuit of FIGURE 6.

Q SENSOR CIRCUITS

The primary function of the 1st Q Sensor circuit shown in FIGURE 5 is to sense a single pair of multiplier digits on each iterative cycle and determine whether 0, 1, 2 or −1 times the multiplicand should be added to the accumulated partial product.

The first Q Sensor circuit comprises gates $\overline{\text{A}}$500 through $\overline{\text{A}}$506, N507, $\overline{\text{O}}$508 through $\overline{\text{O}}$510 and a flip-flop 512. The output from the reset side of Q01 is connected by way of lead 442 to one input of the gates 500, 501 and 504. The output from the set side of Q01 is connected to the gates 502, 503 and 505 and 506. The output from the reset side of Q00 is applied by way of lead 446 to one input of gates 501, 503 and 505. The output from the set side of Q00 is connected to one input of gates 500, 502, 504 and 506. The Carry 2 signal generated by the 2nd Q Sensor circuit is applied over lead 614 to gates 501, 503 and 504. The output from the reset side of the Carry 2 flip-flop is applied by way of lead 616 to one input of gates 500, 502 and 505.

The outputs from gates 500 and 501 are applied to $\overline{\text{O}}$508 which produces the negative command X to X* if either of the gates produces a positive output signal. Gates 502 and 503 are connected to $\overline{\text{O}}$509 which produces the negative command X′ to X* if either of these gates produces a positive output signal. The gates 504 and 505 have their outputs connected to $\overline{\text{O}}$510 which produces the negative command X to X* (L1) if either of these gates produces a positive output signal.

Phase 4 clock pulses are inverted at N508 to reset the Carry 1 flip-flop 512 at phase 4 of each cycle. The gates 506 and 507 have their outputs connected to the set input terminal of the Carry 1 flip-flop.

TABLE III

| Sense | | | Transfer X to X* | Carries | FEB |
|---|---|---|---|---|---|
| C2 | Q01 | Q00 | | | |
| 0 | 0 | 0 | 0X | | FEB1 |
| 0 | 0 | 1 | 1X | | FEB1 |
| 0 | 1 | 0 | 2X | | FEB1 |
| 0 | 1 | 1 | −1X | C1 | |
| 1 | 0 | 0 | 1X | | FEB1 |
| 1 | 0 | 1 | 2X | | FEB1 |
| 1 | 1 | 0 | −1X | C1 | |
| 1 | 1 | 1 | 0X | C1 | FEB1 |

Table III is a truth table for the 1st Q Sensor circuit. When two multiplier digits are sensed it may be necessary to add in 0, 1, 2, or 3 times the value of the multiplicand depending upon whether the binary digits sensed are 00, 01, 10 or 11, respectively. When the multiplier digits are 00 all that is necessary is to prevent the multiplicand from being added in with the accumulated partial product. When the multiplier digits are 01 it is merely necessary to transfer the multiplicand to the accumulator and add it to the previous partial product. When the multiplier digits are 10 it is necessary to add two times the multiplicand to the previous partial product. This can be accomplished by shifting the multiplicand one binary order to the left and adding it to the previous partial product. When the multiplier digits are 11 it requires that three times the multiplicand be added to the previous partial product. This creates a problem since three times the multiplicand cannot be formed without performing an addition operation. However, this problem may be overcome by subtracting one times the multiplicand from the accumulated partial product to obtain a new accumulated partial product, then shifting the new accumulated partial product to the right two binary orders and adding in one times the multiplicand. This creates a further problem where two consecutive pairs of multiplier digits are 11. The second pair of multiplier digits requires the addition of three times the multiplicand. In addition, one times the multiplicand must be added in to complete the formation of three times the multiplicand required by the first pair of digits, thus requiring that the second partial product be four times the multiplicand. Since the present invention does not include means for forming a partial product of four times the multiplicand the same effect is obtained by adding in zero times the multiplicand, shifting the accumulated partial product right two binary orders and then adding in one times the multiplicand. In both of these cases where a carry-over is required some means must be provided to remember this fact so that when the next pair of multiplier digits is sensed the carry-over of one times the multiplicand is taken into account when forming the new partial product. This is the purpose of Carry 1 flip-flop 512. Each time the 1st Q Sensor circuit determines that a carry-over to the next sensing operation is required to Carry 1 FF is set to provide a negative signal C1 on the lead 514. If the 1st Q Sensor circuit determines that it is not necessary to provide a carry-over the Carry 1 FF remains reset and the negative signal $\overline{\text{C1}}$ appears on lead 516. The outputs from the Carry 1 FF are applied to the 2nd Q Sensor circuit thus enabling the 2nd Q Sensor circuit to form a partial product which takes into account the carry-over from the previous sensing operation performed by the 1st Q Sensor. As will be shown subsequently, a similar carry flip-flop exists in the 2nd Q Sensor circuit which generates a negative signal on the lead 614 each time the 2nd Q Sensor circuit senses that a carry-over to the next sensing operation is required.

To illustrate the operation of the 1st Q Sensor circuit assume that Q01 contains a binary 1 and Q00 contains a zero. Assume further that no Carry 2 signal appears on lead 614 because there is no carry-over from the preceding sensing operation. Under these conditions the leads 444, 312, 616 and 446 are all negative and condition $\overline{\text{A}}$505. The gate produces a positive output signal which is inverted at $\overline{\text{O}}$511 to become the command X to X* (L1). As will be shown subsequently, this causes the multiplicand in the X register to be shifted one binary place to the left as it is transferred from X to X* in preparation for being added to the previous accumulated partial product. The shift of one binary order to the left effectively forms two times the multiplicand which is the desired partial product since the multiplier digits are 10.

Assume now that the multiplier digits are 10 and that because the previous multiplier digits sensed by the 2nd Q Sensor circuit were 11, the lead 614 is negative. Under these conditions the leads 446, 444 and 614 are all negative and condition $\overline{\text{A}}$507. In addition, the lead 312 is negative so that gate 503 is conditioned. The output of 503 is inverted at 510 to become the command X′ to X*. This causes the complement of the multiplicand to be gated from X to X* to be added to the accumulated partial product. Stated differently, this causes the multiplicand to be subtracted from the accumulated partial product. $\overline{\text{A}}$507 produces a positive output signal to set the Carry 1 FF 512 to provide the 2nd Q Sensor circuit an indication that one times the multiplicand must be added in on the next operation.

The remaining conditions under which the Carry 1 FF is set and the commands X to X*, X′ to X*, and X to X* (L1) are produced are believed obvious from consideration to Table III.

For the reasons stated previously it is desirable to be able to anticipate when an end around borrow is necessary when the partial product is combined with the accumulated partial product in the A*B* half-subtractor. It can be shown that such an end around borrow is always generated when the multiplicand is added to the accumulated partial product but is never generated when the multiplicand is subtracted from the accumulated partial product. The gates 507 and 524 detect the two conditions under which it is necessary to subtract the multiplicand from the accumulated partial product. $\overline{\text{A}}$507 is conditioned by the C2 signal from the 2nd Q Sensor circuit, the absence of a binary one in Q00 and the presence of a one in Q01. $\overline{A}$524 is conditioned by the presence of binary ones in both Q00 and Q01 and the presence of a positive signal on lead 816 indicating the absence of a carry from the preceding sensing operation. Both 507 and 524 are further conditioned by phase 1 clock pulses and if the multiplicand is being subtracted from the accumulated partial product one of the gates produces a positive output signal to set flip-flop 526.

The set output terminal of flip-flop 526 is connected to one input of $\overline{A}$528. This gate is further conditioned by phase 2 clock pulses and produces a positive output signal to reset the FEB1 flip-flop 530 on phase 2 of a cycle if flip-flop 526 is set. Flip-flop 526 is reset during phase 4 of each cycle by the output from N508. The resulting negative signal off the reset side of the flip-flop conditions one input of $\overline{A}$532. This gate is further conditioned by phase 2 clock pulses. Therefore, on any cycle in which the 1st Q Sensor circuits determine that the partial product is something other than minus one times the multiplicand and thus fails to set the flip-flop 526, $\overline{A}$532 produces a positive output signal to set the FEB1 flip-flop. The FEB1 signals generated by flip-flop 530 are applied to the A* and B* registers of FIGURE 8 and the first full subtractor shown in FIGURE 10.

In order to illustrate the operation of the Q Sensor circuits the timing diagram of FIGURE 13*b* has been drawn for the case of a multiplier and multiplicand having the following values.

Mp 010110 001000 111110 110111 010011 100101
Mc 011000 000000 000000 000000 000000 000000

The 2nd Q Sensor is shown in FIGURE 6. On each iterative cycle this sensor senses the pair of multiplier digits in Q*03 and Q*02 and the Carry 1 signal from the 1st Q Sensor and produces a Carry 2 indication and an indication of whether zero, one, two, or minus one times the multiplicand should be gated to the XS register as a partial product. If it is determined that the partial product is not minus one times the multiplicand then the FEB2 FF is set for the purpose of sign extension and end around borrow.

The signal C1 is applied to a plurality of gates $\overline{A}$601, $\overline{A}$604 and $\overline{A}$607. The signal $\overline{Q*02}$ is applied to the gates 601 and 607 and a further gate $\overline{A}$605. The signal Q*03 is applied to the gates 605 and 607 and two further gates $\overline{A}$606 and $\overline{A}$624. The command Enable 1XS, 2XS, −1XS, C appearing on lead 316 is applied to the gates 601, 604, 605, 606, 607 and 624 and a further gate $\overline{A}$602. The signal $\overline{C1}$ is applied to gates 602, 605 and 624. The signal Q*02 is applied to gates 602, 604, 606 and 624. The signal $\overline{Q*03}$ is applied to the gates 601, 602 and 604. Each of the gates 601 through 607 and 624 are further conditioned by phase 1 clock pulses.

The outputs of gates 606 and 607 are connected to the set input terminal of a Carry 2 FF 612. The outputs from gates 604 and 605 are applied to the set input terminal of a flip-flop 611, the outputs from gates 601 and 602 are applied to a flip-flop 609, and the outputs from gates 607 and 624 are applied to the set input terminal of a flip-flop 626. The flip-flops 609, 611 and 626 may be cleared in response to the command C1 XS appearing on lead 222, 246 or 340. The C1 XS command is inverted at $\overline{O}$654 and applied to $\overline{A}$656 which is further conditioned by phase 2 pulses. Upon occurrence of the command C1 XS gate 656 produces a positive output signal during phase 2 to reset the flip-flops 609, 611 and 626.

FF612 is reset on phase 2 of each iterative cycle by the command C1 2nd Carry. This command is generated by the 3rd Multiply Sequence FF and occurs on phase 2 of every cycle except cycle 18 of the multiply operation.

The gates 601 through 607 and 624 are enabled by the command Enable 1XS, 2XS, −1XS, C appearing on lead 316 as long as the Second Multiply Control FF is set. Therefore, on phase 3 of each machine cycle from time 82 until time 163 the gates 601 through 607 and 624 sense the values C1, Q*03 and Q*02 to set the flip-flops 609, 611, 612 and 626. FF612 is set if there is to be a carry-over to the next succeeding sensing operation. The outputs of FF612 are applied to the 1st Q Sensor for this purpose.

FF611 is set if it is determined that the partial product should be two times the multiplicand. When the flip-flop is set it produces the command X to XS (L1) which is applied to the X to XS gating circuits to transfer the multiplicand from X to XS with a shift of one order to the left.

FF609 is set when it is determined that the partial product should be one times the multiplicand. When this flip-flop is set it produces the command X to XS which is applied to the X to XS gates to transfer the multiplicand in X to the XS register.

FF626 is set when it is determined that the partial product should be minus one times the multiplicand. When this flip-flop is set it produces the commnad X′ to XS which is applied to the X to XS gates to transfer the complement of the multiplicand in X to the XS register.

The set and reset output terminals of FF626 are connected to gates $\overline{A}$628 and $\overline{A}$632, respectively. Gate 632 is conditioned by the command Enable FEB2 which is produced from time 82 until time 182 while the 3rd Multiply Control FF is set. Gates 628 and 632 are both conditioned by phase 4 clock pulses and have their outputs connected to the reset and set input terminals, respectively, of the FEB2 FF.

On phase 4 of each cycle from cycle 8 through cycle 17, the gate 632 is conditioned if the FF626 is not set at phase 3. This stores a forced end borrow signal in flip-flop 630 on each sensing operation in which the 2nd Q Sensor determines that the partial product should not be minus one times the multiplicand. If the partial product should be one times the multiplicand FF626 is set on phase 3 to condition gate 628 and on phase 4 the clock pulse passes through the gate to reset FEB2 and store an indication that there is no forced end borrow.

Table IV summarizes the operation of the 2nd Q Sensor in response to the C1, Q*03 and Q*02 signals. A comparison with Table III shows that the operation of the first and second Q Sensors is the same.

| Sense | | | Transfer X to XS | Carries | FEB |
|---|---|---|---|---|---|
| C1 | Q*03 | Q*02 | | | |
| 0 | 0 | 0 | 0X | | FEB2 |
| 0 | 0 | 1 | 1X | | FEB2 |
| 0 | 1 | 0 | 2X | | FEB2 |
| 0 | 1 | 1 | −1X | C2 | |
| 1 | 0 | 0 | 1X | | FEB2 |
| 1 | 0 | 1 | 2X | | FEB2 |
| 1 | 1 | 0 | −1X | C2 | |
| 1 | 1 | 1 | 0X | C2 | FEB2 |

TABLE IV

The 2nd Q Sensor also includes N640, $\overline{A}$652, $\overline{A}$644, $\overline{O}$646, $\overline{A}$648, $\overline{O}$650 and $\overline{A}$652. As previously explained, the multiplier enters X, passes through XS and the A register, and is entered into the Q and Q* registers during the set-up sequence. Furthermore, the multiplier must be exhibited as a positive value in the Q and Q* registers. This requires that the multiplier be entered into Q and Q* in true form if positive and entered into Q and Q* in complement form if negative.

The multiplier is entered into the X register at time 43. At time 52 the command C1, XS appears on lead 222 to clear flip-flops 609, 611 and 626. At time 53 the Set-Up Sequence controls generate the command Set |XS| on lead 224. This signal is inverted at N640 and conditions both gates 642 and 644. The sign of the multiplier is in stage X35 of the X register. If the sign is positive the signal $\overline{X35}$ is negative and gate 642 produces a positive output signal. This signal is inverted at $\overline{O}646$ and passes through gate 648 to set flip-flop 609. The output of 609 is the command X to XS which gates the value in X to the XS register. This value subsequently enters the A register and is then transferred to Q and Q*.

If the sign of the multiplier is negative then the signal XS35 is negative and at time 53 the gate 644 produces a positive output signal. This signal is inverted at $\overline{O}650$ and passes through $\overline{A}652$ to set flip-flop 626. The output of 626 is the command X′ to XS which gates the complement of the value in X to the XS register. This value subsequently enters the A register and is then transferred to Q and Q*.

It was also previously explained that the multiplicand must be expressed as a positive number. The present invention assumes initially that all multiplicands are negative and require complementing.

The multiplicand is entered into the X register at time 63. At time 62 the command C1 XS is generated on lead 246 to reset flip-flops 609, 611 and 626. At time 63 the Set-Up Sequence controls generate the command Set —XS. This command passes through $\overline{O}650$ and $\overline{A}652$ to set flip-flop 626. The output from the set side of FF626 gates the complement of the multiplicand from X to XS. This complement value is subsequently transferred to the A register and the sign stage X35 sampled by the Set-Up Sequence controls to determine the true sign of the multiplier. If the sign is positive then the A register is cleared and the true value remains in the X register. If the sign is negative the X register is cleared and the complement value in the A register transferred thereto.

X, X* AND XS REGISTERS

The X register is shown in FIGURE 7*a*. Both the multiplier and multiplicand are entered into the multiplier circuits through this register and during the actual multiplication operations the multiplicand is stored therein. The register comprises thirty-six identical stages with the sign stage X35 and the two low order stages X01 and X00 being shown in FIGURE 7*a*. Each stage includes a flip-flop 700 and a pair of input transfer gates 702 and 704. Each stage of the X register may be reset in response to a Clear X command appearing on one of the leads 250, 284, or 706. The commands are inverted at $\overline{O}708$ and applied to one input of $\overline{A}710$. The Clear X command on lead 706 is generated by the main computer controls (not shown) during cycle 4 of the multiply operation. The command Clear X appearing on lead 250 or 284 is generated by the set-up sequence circuits in FIGURE 2 with the signal on lead 284 being generated only if the sign of the multiplicand is minus. $\overline{A}710$ is further conditioned by phase 2 clock pulses and it produces a positive output signal to reset each of the flip-flops 700 at times 42 and 62 and also at time 72 if the multiplicand is negative.

Information is entered into the X register on the phase immediately following the phase in which the register is reset. Each of the gates 704 is connected to the output of one stage of the central memory output register. The command Z to X is generated by the main computer controls during cycles 4 and 6 of the multiply operation and is applied by way of lead 712 to one input of each of the gates 704. The gates 704 are further conditioned by phase 3 clock pulses so at time 43 or 63 the gate 704 produces a positive output signal to set one stage of the X register if the word being read out of memory contains a binary one in the corresponding stage.

Information may also be entered into the X register from the A register. During the multiply operation this transfer occurs only if the multiplicand is a negative number. If the multiplicand is a negative number the command A to X appears on lead 286 and is inverted at $\overline{O}714$ and applied to one input of each of the gates 702. These gates are further conditioned by phase 3 clock pulses and the output from the set side of the corresponding stage of the A register. Therefore, if the sign of the multiplicand is minus the value in the A register is transferred to the X register at time 73 of the multiply operation.

Output signals from each stage of the X register are applied to the X to XS gates of FIGURE 7*b* and the X to X* gates of FIGURE 7*c*. In addition, sign stage X35 is connected to the product sign determining circuits of FIGURE 2 and the 2nd Q Sensor circuits of FIGURE 6.

The X to XS gates 14 and the XS register 18 are shown in FIGURE 7*b*. The X to XS gates comprise thirty-six stages each having three gates $\overline{A}720$, $\overline{A}722$ and $\overline{A}724$. The gate 720 in each stage of the X to XS gates is connected to the set output terminal of the next lower order stage of the X register with the gate 720 of the low order stage being connected to the output of stage X35. Each of the gates 720 is further conditioned by the command X to XS (L1) generated by the 2nd Q Sensor circuits. The output of the gate 720 in each stage is applied to the corresponding stage of the XS register 18. It is seen, therefore, that upon occurrence of the command XS (L1) the gates 720 transfer the value in the X register to XS with a shift of one binary order to the left.

The gate 722 in each stage of the X to XS gates is connected to the set output terminal of the corresponding stage of the X register. These gates are further conditioned by the command X to XS and upon occurrence of this command cause the content of the X register to be applied to the XS register 18.

The gate 724 in each stage of the X to XS gates is connected to the reset output terminal of the corresponding stage of the X register. Each of the gates 724 is further conditioned by the command X′ to XS and upon occurrence of this command gates the complement of the value in the X register to the XS register.

The XS register has no storage ability. It can generate a significant output only as long as one of the commands X to XS, X′ to XS, or X or XS (L1) is present. Each stage of the XS register includes a circuit $\overline{O}726$ connected to the output of the gates 720, 722 and 724. The outputs of 720, 722 and 724 are joined together in the XS register to form the complement output of each stage.

The X to X* gates 12 are shown in FIGURE 7*c*. These gates comprise thirty-six stages with each stage except the low order stage having a first gate $\overline{A}728$, a second gate $\overline{A}730$ and a third gate $\overline{A}732$.

The gate 728 in each stage of the gating circuit is connected to the reset output of the corresponding stage of the X register. The gates 728 are further conditioned by the command X′ to X* from the 1st Q Sensor circuit and phase 1 signals. Therefore, upon occurrence of the command X′ to X* the gates 728 are conditioned to gate the complement of the value in the X register to the X* register.

The gate 730 in each stage of the gating circuit is connected to the set output terminal of the corresponding stage of the X register. The gates 730 are further conditioned by the phase 1 clock pulses and the command X to X* generated by the 1st Q Sensor circuits. Upon occurrence of the command X to X* the gates 730 are conditioned during phase 1 to gate the value in the X register to the corresponding stage of the X* register.

Each of the stages 35 through 01 of the gating circuit has a gate $\overline{A}732$ connected to the set output terminal of the next lower order stage of the X register. The gates 732 are further conditioned by the command X to X* (L1) and phase 1 clock pulses and upon occurrence of the command X to X* (L1) the gates 732 transfer the value in the X register to the X* register with a shift of one binary order to the left. If the multiplicand is held in the X register it is seen that this operation is equivalent to multiplying the multiplicand by two and entering it into the X* register.

The outputs from gates 728, 730 and 732 in each stage of the X to X* gating circuits is connected to the set input terminal of a flip-flop 734 in the corresponding stage of the X* register. All stages of this register are always cleared on the phase immediately preceding the phase in which information is entered into the register. The command Clear X* on lead 299 is generated during the set-up sequence and the command Clear X* on lead 362 is generated during the multiply sequence. These commands are applied to $\overline{O}$736 which has its output connected to a gate $\overline{A}$738. $\overline{A}$738 is further conditioned by phase 4 clock pulses and thus produces a positive output signal during phase 4 of cycles 7 through 17. The output of $\overline{A}$738 is connected to the reset input terminal of each of the flip-flops 734 to reset the flip-flops at this time. The set and reset output terminals of each stage of the X* register are connected to the corresponding stage of the A*B* half-subtractor shown in FIGURE 8.

HALF-SUBTRACTORS

The A*B* half-subtractor is shown in the lower portion of FIGURE 8. The half-subtractor comprises thirty-six identical stages of which the high order stage 35 and the low order stage 00 are shown in FIGURE 8 .

Considering stage 35 as an example, each stage of the half-subtractor includes a plurality of gates $\overline{A}$800, $\overline{A}$802, $\overline{A}$804, $\overline{A}$806, $\overline{A}$808 and $\overline{O}$810. The set output terminal of the corresponding stage of the X* register is connected to the gate 802 while the reset output terminal is connected to the gates 800 and 808. The set output terminal of the corresponding stage of the A register is connected to the gate 804 and the reset output terminal of the corresponding stage of the A register is connected to the gate 806. The set output terminal of the next lower order stage of the B register is connected to the gates 800 and 808 while the reset output terminal of the next lower order stage of the B register is connected to the gate 802. The output terminal of 800 and 802 are connected to both $\overline{A}$806 and $\overline{O}$810. The output of 810 is applied to one input of 804.

Signals representing the values in A, B and X* are continuously applied to the half-subtractor which continuously generates the result obtained by half-subtracting the complement of X* from A and then half-subtracting B from this result. The positive command Enter A*B* appears on lead 344 as long as the First Multiply Sequence FF is set. The command is inverted at $\overline{O}$812 and applied to one input of each of the gates 804, 806 and 808. These gates are further conditioned by phase 3 clock pulses so at phase 3 of cycles 8 through 17 the gates are conditioned to transfer the result of the half-subtract operation to the A* and B* registers.

Table V is a truth table for predicting the output of a single stage of the half-subtractor in response to the inputs from the A, B and X* registers.

| A | B | X* | A* | B* |
|---|---|---|---|---|
| 0 | 0 | 0 | 1 | 1 |
| 0 | 0 | 1 | 0 | 0 |
| 1 | 0 | 0 | 0 | 0 |
| 1 | 0 | 1 | 1 | 0 |
| 0 | 1 | 0 | 0 | 1 |
| 0 | 1 | 1 | 1 | 1 |
| 1 | 1 | 0 | 1 | 1 |
| 1 | 1 | 1 | 0 | 0 |

TABLE V

Consider the case where the inputs from A, B and X* are all zero. Because A is zero the lead 814 is positive and blocks gate 804. Because B contains a zero the lead 816 is positive and blocks gates 800 and 808. Because X* contains a zero the lead 818 is positive to block the gate 802. When gates 800 and 802 are blocked they produce negative output signals to condition two inputs of gate 806. Because A is zero the lead 820 is negative and conditions a third input of 806. Upon occurrence of the phase 3 clock pulse and the command Enter A*B* all inputs to gate 806 are conditioned and it produces a positive output signal to set both A* and B*.

As a second example, consider the case where A, B and X* are all binary one. Because A is one the lead 820 is positive and blocks gate 806. Because X* is one the lead 822 is positive and blocks gates 800 and 808. Because B is one the lead 824 is positive and blocks gate 802. Gates 800 and 802 are blocked hence they both apply negative signals to $\overline{O}$810. With all inputs negative $\overline{O}$810 produces a positive output signal to block 804. Upon occurrence of the command Enter A*B* and the phase 3 clock pulse each of the gates 804, 806 and 808 has a positive signal applied to at least one of its inputs, hence each of the gates produces a negative output signal. Since the flip-flops of the A* and B* registers may be set only in response to positive signals it is seen that the negative outputs from the gates 804, 806 and 808 have no effect on the flip-flops and they remain in the reset or zero state.

The operation of the half-subtractor in response to other combinations of signals from the A, B and X* registers is obvious from the truth table and the foregoing examples.

The A* and B* registers are also shown in FIGURE 8. The A* register includes thirty-seven flip-flops 830 while the B* register includes thirty-seven flip-flops 832. The flip-flop 830 in stages A*00 through A*35 has its set input terminal conected to the gates 804 and 806 in the corresponding stage of the A*B* half-subtractor. The flip-flop 832 in stages B*00 through B*35 has its set input terminal connected to the output of the gates 806 and 808 in the corresponding stage of the half-subtractor.

During the multiply operation the A* and B* registers are cleared simultaneously during phase 2 of cycles 8 through 17. This resets all of the flip-flops 830 and 832 immediately before information is entered into the register from the half-subtractor. The command Clear A*B* appearing on lead 342 is inverted at $\overline{O}$834 and $\overline{O}$836 and applied to one input of $\overline{A}$838 and $\overline{A}$840. The gates 838 and 840 are further conditioned by phase 2 clock pulses and if the command Clear A*B* is present the positive output from 840 is applied to the reset input terminal of each of the flip-flops 832 while the positive output from 838 is applied to the reset input terminal of each of the flip-flops 830.

The sum digits in A* are right shifted two binary orders and the borrow digits in B* are right shifted one binary order as the accumulated partial product in A* and B* is applied to the AB half-subtractor. Since the accumulated partial product may be either a positive or a negative number some means must be provided for extending the sign or filling in the positions left vacant by the right shift operation. The signal FEB1 on lead 534 conditions one input of a gate $\overline{A}$842, which has its output connected to the set input terminals of A*36 and B*36. Gate 842 is further conditioned by phase 3 clock pulses and if an FEB1 signal is present it produces a positive output signal to set A*36 and B*36. As previously explained, the FEB1 signal is generated when the partial product is zero, one, or two times the multiplicand since half-subtracting the complement of one of these values always produces a result in A* which has a negative sign.

The output from A*36 is applied to stages 35 and 34 of the AB half-subtractor or while the output of stages A*35 through A*02 are applied to stages 33 through 00 of the half-subtractor. The outputs from B*36 through B*01 are applied to stages 35 through 00, respectively, of the AB half-subtractor. Output signals from A*00, A*01 and B*00 are applied to the first full subtractor shown in FIGURE 10.

The AB half-subtractor is shown in the lower portion of FIGURES 9*a* and 9*b*. The operation of this circuit is identical to that of the A*B* half-subtractor previously described. Each stage of the AB half-subtractor comprises elements 900, 902, 904, 906, 908 and 910 which function is the same manner as the elements 800, 802, 804, 806, 808 and 810 of the A*B* half-subtractor. Each stage of the AB half-subtractor receives input signals from the corresponding stage of the XS register, the next higher order stage of the B* register and the second higher order stage of the A* register. As noted above, there is one exception to this general arrangement, that exception being where A*36 is applied to both stages 35 and 34 of the half-subtractor for the purposes of sign extension.

Table VI is a truth table for predicting the output of the AB half-subtractor.

| A* | B* | XS | A | B |
|---|---|---|---|---|
| 0 | 0 | 0 | 1 | 1 |
| 0 | 0 | 1 | 0 | 0 |
| 1 | 0 | 0 | 0 | 0 |
| 1 | 0 | 1 | 1 | 0 |
| 0 | 1 | 0 | 0 | 1 |
| 0 | 1 | 1 | 1 | 1 |
| 1 | 1 | 0 | 1 | 1 |
| 1 | 1 | 1 | 0 | 0 |

TABLE VI

In view of the similarities between the AB half-subtractor and the A*B* half-subtractor previously described, a further description of this unit is believed unnecessary.

The command Enter AB appears on lead 370 as long as the Second Multiply Sequence FF is set. This command is inverted at $\overline{O}$912 and applied to one input of each of the gates 904, 906 and 908. These gates are further conditioned by phase 1 clock pulses so that the output of the AB half-subtractor is gated to the A and B registers during phase 1 of cycles 9 through 18.

The difference digits and borrow digits representing the accumulated partial product developed by the AB half-subtractor are stored in the A and B registers, respectively. These registers are shown in the top portion of FIGURES *9a* and *9b*.

The A register comprises thirty-eight stages each having a flip-flop 930. The set input terminals of the flip-flops 930 in stages A33 through A00 are connected to the gates 904 and 906 in stages 35 through 02, respectively, of the AB half-subtractor. The set input terminals of the flip-flops in stages A37 and A36 are responsive to output signals from the gates 904 and 906 in stages 01 and 00, respectively. Thus, the partial products developed by the AB half-subtractor are right shifted two binary orders on the transfer to the A register.

Information in the XS register, stages 35 through 00, may be entered into the corresponding stages of the A register. This transfer occurs in response to the command XS to A appearing on leads 233 and 264 during the set-up sequence. The command XS to A is inverted at $\overline{O}$914 and applied to one input of a set of read-in gates $\overline{A}$916. The read-in gates are further conditioned by phase 1 clock pulses and have their outputs connected to the set input terminal of one of the flip-flops 930 so at times 61 and 71 of the set-up sequence the value in XS is gated into the A register.

The command Clear A appears on leads 262 and 295 during the set-up sequence and is inverted at $\overline{O}$918 and applied to one input of $\overline{A}$920. $\overline{A}$920 is further conditioned by phase 4 clock pulses and at times 64 and 74 of the set-up sequence produces a positive output signal which is applied to the reset input terminal of the flip-flop in stages A00 through A35. The command Clear AB appears on lead 360 as long as the Second Multiply Sequence flip-flop is set. The command is inverted at $\overline{O}$922 and passes through N924 and $\overline{O}$918 to condition one input of $\overline{A}$920. Therefore, $\overline{A}$920 produces positive output signals to reset the A register during phase 4 of cycles 8 through 17.

Information is also entered into the A register from the Main Adder 44 over the leads 926. The Main Adder and Borrow Pyramids are fully disclosed in copending application Serial No. 193,526, filed concurrently herewith. The adder produces a positive output signal if the corresponding stage contains a zero and a negative output signal if the corresponding stage contains a one. This output is applied by way of the lead 926 to the reset input terminal of the corresponding stage of the A register. When it is desired to transfer a value from the Main Adder to the A register the command Set A to 1 appears on lead 386. The command is inverted at $\overline{O}$928 and applied to one input of $\overline{A}$930. This gate is further conditioned by phase 1 clock pulses and produces positive output signals which are applied to the set input terminals of the flip-flops 930 in stages A35 through A00. Therefore, the transfer of information from the Main Adder to the A register is accomplished by first setting each stage of the A register to one on phase 1 and then on phase 2 resetting each stage of the A register where the corresponding stage of the adder produces a positive output signal.

The borrow digit storage register B is a thirty-seven stage register with each stage containing a flip-flop 932. The set input terminals of the flip-flops in stages B33 through B00 are connected to the outputs of the gates 906 and 908 of stages 35 through 02, respectively, of the AB half-subtractor. The flip-flops in stages B36 and B35 have their set input terminals connected to the outputs of gates 906 and 908 in stages 01 and 00, respectively, of the half-subtractor. The B register is always cleared on the phase before information is entered therein. The output of $\overline{O}$922 is applied to one input of $\overline{A}$934 which is further conditioned by phase 4 clock pulses. During phase 4 of cycles 8 through 18 gate 934 produces a positive output signal which is applied to the reset input terminal of the flip-flop in each stage of the B register as well as the reset input terminal of the flip-flops in stages A36 and A37.

It becomes obvious from the preceding description that the output of the AB half-subtractor is effectively shifted to the right two binary orders during the transfer to the A and B registers. This leaves stages B34, A34 and A35 empty. In order to extend the sign into these positions the FEB2 signal on lead 634 is applied to one input of a gate $\overline{A}$936. This gate is further conditioned by phase 1 clock pulses and has its output connected to the set input terminal of the flip-flops in stages B34, A34 and A35.

Output signals from stages B34 through B00 are continuously applied to the A*B* half-subtractor with a shift of one binary order to the left. Stage B36 is applied to the low order stage of the A*B* half-subtractor. Output signals from A35 through A00 are continuously applied without shift to the A*B* half-subtractor. In addition, the set output terminal of stages A35 through A00 is connected to a read-in gate associated with the X register and a read-in gate associated with the Q register so that the content of the A register may be transferred to X or Q without shift as the multiplier and multiplicand are checked for sign and then stored during the set-up sequence.

The set and reset output terminals of B35 as well as A37 and A36 are connected to the second full-subtractor shown in FIGURE 11 for the purpose of developing two product digits during each of the iterative cycles.

FULL SUBTRACTORS AND BUFFERS

The first full subtractor 32 and the 1st Q Buffer 36 are shown in FIGURE 10. The purpose of the first full subtractor is to perform a full subtract operation in which the forced end borrow, the borrow or overflow indication from the previous full subtract performed by the second full subtractor, and the borrow from the low order of B* are subtracted from the two low order bits of A*. This is done to save the borrow which would otherwise be lost when B* is right shifted and applied to the AB half-subtractor. The result of the subtract operation is a pair of product digits and a borrow signal which are gated into the 1st Q Buffer. The two product digits are subsequently entered into Q33 and Q32 while the borrow digit is applied to the second full subtractor shown in FIGURE 11.

The signals B*00 and $\overline{A}$*01 are applied to the gates 1000 and 1002. The output of gate 1000 is connected to the set input terminal of the Borrow 1 flip-flop. The output of gate 1002 is connected to $\overline{O}$1004 and $\overline{A}$1006. The signals $\overline{B}$*00 and A*01 are applied to $\overline{A}$1008 which has its output connected to $\overline{O}$1004 and $\overline{A}$1006. The output from $\overline{O}$1004 is applied to $\overline{A}$1010. The signals Borrow 2 and FEB1 are applied to $\overline{A}$1012 which has its output connected to $\overline{O}$1014, $\overline{O}$1016, $\overline{A}$1010 and $\overline{A}$1018. The signal $\overline{A}$*00 is applied to $\overline{A}$1018 and $\overline{O}$1020. The signals $\overline{\text{FEB1}}$ and $\overline{\text{Borrow}}$ 2 are applied to $\overline{A}$1022 which has its output connected to $\overline{O}$1016, $\overline{A}$1018 and $\overline{O}$1020. The output from $\overline{O}$1016 and the signal A*00 are applied to $\overline{A}$1024 which has its output connected to the set input terminal of the low order stage of the 1st Q Buffer. The output of $\overline{A}$1018 is also applied to the set input terminal of the low order stage of the 1st Q Buffer. The output of $\overline{O}$1020 is applied to $\overline{A}$1010 and $\overline{O}$1014 while the output of $\overline{O}$1014 is applied to $\overline{A}$1006. The output of $\overline{A}$1010 is applied to the set input terminal of the high order stage of the 1st Q Buffer while the output of $\overline{A}$1006 is applied to the set input terminal of both the Borrow 1 flip-flop and the high order stage of the 1st Q Buffer.

A phase 1 clock pulse is applied to each of the gates 1000, 1006, 1010, 1018 and 1024 so that the result of the full subtract operation can be gated into the 1st Q Buffer register only during phase 1 of each cycle. In addition, the gates 1000 and 1006 are conditioned by an Enable Borrow 1 command appearing on lead 326. This command is generated from time 82 until time 182 and thus enables the gates 1000 and 1006 to produce borrow signals during cycles 9 through 18. At all other times the Enable Borrow 1 signal is positive to prevent the Borrow 1 flip-flop from being set.

The second full subtractor 34 and the 2nd Q Buffer 38 are shown in FIGURE 11. The 2nd Q Buffer is cleared on phase 2 of each cycle in which the Third Multiple Sequence flip-flop is reset. The command Clear 2nd Buffer appears on lead 382 and is applied to the reset input terminal of the Borrow 2 flip-flop and the flip-flops in both stages and the 2nd Q Buffer Register.

As explained before, the present multiply operation involves nine iterative cycles during which the thirty-six multiplier digits are sensed and thirty-six low order digits of the product are developed. At the end of these nine iterative cycles the sign and thirty-five high order digits of the product are represented as a series of difference digits and a series of borrow digits. Therefore, a further cycle takes place in which these borrow digits are half-added to the sum digits in the main adder. The second full subtractor produces the last pair of product digits developed during the iterative cycles. In addition it may develop a borrow signal which sets the Borrow 2 flip-flop. This borrow must be taken into account when the borrow digits and sum digits representing the accumulated partial product are half added in the main adder. The set side of the Borrow 2 flip-flop is connected to a gate 1126 which is further conditioned by the command B2 to Adder which appears on lead 390. This command is generated from phase 3 of cycle 17 until phase 3 of cycle 18 which is the time the final half-add takes place in the main adder. The output of $\overline{A}$1126 is the signal B2 which is applied as an end borrow signal to the borrow pyramid of the main adder.

The second full subtractor functions in the same manner as the first full subtractor. It receives signals from A37, A36, B35, FEB2 and Borrow 1. The borrow signal B35 is subtracted from A37 while the borrows represented by the Borrow 1 and FEB2 signals are subtracted from A36. The result of the subtract operation is gated into the 2nd Q Buffer on phase 3 of each cycle when a clock pulse conditions the gates 1100, 1106, 1110, 1118 and 1124.

| A*01 | A*00 | B*00 | FEB1 | Borrow 2 | Borrow 1 | BFR1 High Order | BFR1 Low Order |
|---|---|---|---|---|---|---|---|
| 0 | 0 | 0 | 0 | 0 | 0 | 0 | 0 |
| 1 | 0 | 0 | 0 | 0 | 0 | 1 | 0 |
| 0 | 1 | 0 | 0 | 0 | 0 | 0 | 1 |
| 1 | 1 | 0 | 0 | 0 | 0 | 1 | 1 |
| 0 | 0 | 1 | 0 | 0 | 1 | 1 | 0 |
| 1 | 0 | 1 | 0 | 0 | 0 | 0 | 0 |
| 0 | 1 | 1 | 0 | 0 | 1 | 1 | 1 |
| 1 | 1 | 1 | 0 | 0 | 0 | 0 | 1 |
| 0 | 0 | 0 | 1 | 0 | 1 | 1 | 1 |
| 1 | 0 | 0 | 1 | 0 | 0 | 0 | 1 |
| 0 | 1 | 0 | 1 | 0 | 0 | 0 | 0 |
| 1 | 1 | 0 | 1 | 0 | 0 | 1 | 0 |
| 0 | 0 | 1 | 1 | 0 | 1 | 0 | 1 |
| 1 | 0 | 1 | 1 | 0 | 1 | 1 | 1 |
| 0 | 1 | 1 | 1 | 0 | 1 | 1 | 0 |
| 1 | 1 | 1 | 1 | 0 | 0 | 0 | 0 |
| 0 | 0 | 0 | 0 | 1 | 1 | 1 | 1 |
| 1 | 0 | 0 | 0 | 1 | 0 | 0 | 1 |
| 0 | 1 | 0 | 0 | 1 | 0 | 0 | 0 |
| 1 | 1 | 0 | 0 | 1 | 0 | 1 | 0 |
| 0 | 0 | 1 | 0 | 1 | 1 | 0 | 1 |
| 1 | 0 | 1 | 0 | 1 | 1 | 1 | 1 |
| 0 | 1 | 1 | 0 | 1 | 1 | 1 | 0 |
| 1 | 1 | 1 | 0 | 1 | 0 | 0 | 0 |
| 0 | 0 | 0 | 1 | 1 | 1 | 1 | 0 |
| 1 | 0 | 0 | 1 | 1 | 0 | 0 | 0 |
| 0 | 1 | 0 | 1 | 1 | 1 | 1 | 1 |
| 1 | 1 | 0 | 1 | 1 | 0 | 0 | 1 |
| 0 | 0 | 1 | 1 | 1 | 1 | 0 | 0 |
| 1 | 0 | 1 | 1 | 1 | 1 | 1 | 0 |
| 0 | 1 | 1 | 1 | 1 | 1 | 0 | 1 |
| 1 | 1 | 1 | 1 | 1 | 1 | 1 | 1 |

TABLE VII

Table VII is a truth table for predicting the output from either the first or the second full subtractor. Consider the case where the inputs to the first full subtractor from A*01, A*00, B*00, FEB1 and Borrow 2 are all ones. The actual arithmetic is illustrated as follows:

```
Borrow 1    High    Low
             ┌─────────A*01
             ↓
             1      1←—A*00
             ┌─────────B*00
             ↓
   −         1      1←—FEB1
   −                1←—Borrow 2
      ─────────────────
      1      1      1
```

The resulting of subtracting 2, 1 and 1 from 3 is minus 1. To obtain the equivalent of minus one both the high and low orders of the first buffer are set to represent the value 3 and the borrow 1 flip-flop is set in order to borrow 1 from the next higher order when the second full subtractor performs the next subtract operation. Subtracting 1 from the next higher order is equivalent to subtracting 4 so the net effect is $-4+3=-1$.

For the numerical example given the leads B*00, A*01, FEB1, Borrow 2 and A*00 are all negative. The remaining inputs to the first half subtractor are positive. The signal $\overline{A}$*01 is positive and blocks $\overline{A}$1002 which produces a negative output signal to condition one input of $\overline{A}$1006. The signal $\overline{B}$*00 is positive and blocks $\overline{A}$1008 which produces a negative output signal to condition a second input of $\overline{A}$1006. Both inputs to $\overline{A}$1012 are negative and it produces a positive output signal which is inverted at $\overline{O}$1014 to condition the third input of $\overline{A}$1006. When the phase 1 clock pulses appear $\overline{A}$1006 produces a positive output signal to set the Borrow 1 flip-flop and the high order stage of the 1st Q Buffer.

The positive output from $\overline{A}$1012 is also inverted at $\overline{O}$1016 and conditions one input of $\overline{A}$1024. This gate is further conditioned by the negative signal A*00 so at phase 1 this gate produces a positive output signal to set the low order stage of the 1st Q Buffer.

This is in agreement with the truth Table VII which shows that the Borrow 1 flip-flop and both orders of the 1st Q Buffer should be set to one if A*01, A*00, B*00, FEB1 and Borrow 2 are all ones. Operation of the first and second full subtractors in response to other combinations of inputs is believed obvious from the foregoing description and the accompanying Table VII.

ITERATION COUNTER

The iteration counter shown in FIGURE 12 determines the number of iterative cycles to be performed during the multiply operation. Where the number of digits in the multiplier is $N=36$ the counter is initially set to a value of $N/4+1=10$. One is subtracted from the value in the counter on each cycle and after ten cycles the count in the counter has been reduced to zero. This allows $N/4=9$ iterative cycles and a single end correction cycle to be performed.

The counter comprises a double rank register having a lower rank designated K and an upper rank designated K*, means for subtracting one from the value in K and entering the result into K*, and means for transferring the value in K* back to K. The command Clear K appears on lead 280 during the set-up sequence and is inverted to $\overline{O}$1200 and applied to one input of a gate $\overline{A}$1202. This gate is further conditioned by phase 3 clock pulses and at time 73 it produces a positive output signal which is applied to the reset input terminal of the flip-flop in each stage of the K register. At time 74 the command Set $K=10$ appears on lead 336. This positive signal is applied to the set input terminals of K03 and K01. Since K00 is the low order and K03 is the high order it is seen that this effectively enters the binary equivalent of decimal 10 into the register.

The set output terminal of K00 is connected to $\overline{A}$1204 and $\overline{A}$1206. The set output terminals of K01, K02 and K03 are connected to one input of the gates 1206, 1208 and 1210, respectively. The reset output terminal of K00 and K01 are connected to $\overline{A}$1212, $\overline{A}$1214 and $\overline{A}$1216. The reset output terminal of K02 is connected to $\overline{A}$1214 and $\overline{A}$1216. The reset output terminal of K03 is connected to $\overline{A}$1216. The outputs of $\overline{A}$1212 and $\overline{A}$1206 are applied to $\overline{A}$1218 while the outputs of $\overline{A}$1208 and $\overline{A}$1214 are applied to $\overline{A}$1220 and the outputs from $\overline{A}$1210 and $\overline{A}$1216 are applied to $\overline{A}$1222. In addition, the output of $\overline{A}$1212 is connected to $\overline{A}$1208 and the output of $\overline{A}$1214 is connected to $\overline{A}$1210. The gates $\overline{A}$1204, $\overline{A}$1218, $\overline{A}$1220 and $\overline{A}$1222 have their outputs connected to the reset input terminal of the flip-flops K*00 through K*03, respectively.

All stages of K* are set to one during phase 1 of every cycle. The clock pulse is inverted at N1224 and applied to the set input terminal of the flip-flop in each stage of K*.

The set output terminals of the flip-flops K*00, K*01, K*02 and K*03 are connected to one input of the gates 1226, 1228, 1230 and 1232, respectively. These gates further receive phase 4 clock pulses and the command K* to K which appears on lead 366 and is inverted at N1234 before being applied to the gates. Therefore, during phase 4 of cycles 8 through 17 the value standing in K* is transferred to the K register. The K register is cleared on phase 3 immediately before this transfer takes place. The command Clear K appearing on lead 346 is inverted at $\overline{O}$1200 and conditions one input of $\overline{A}$1202. Upon occurrence of the phase 3 clock pulse 1202 produces a positive output signal to reset each of the flip-flops in the K register.

To illustrate the operation of this counter assume that the value 10 is entered into K at time 74. At time 81 the output of N1224 sets each stage of K*. Since K00 contains a zero it applies a positive signal to $\overline{A}$1204 and $\overline{A}$1206. Since K01 contains a one the positive signal off the reset side blocks $\overline{A}$1212, $\overline{A}$1214 and $\overline{A}$1216 causing these gates to produce negative output signals. Since K03 contains a one the negative signal off the set side of the flip-flop conditions one input of $\overline{A}$1210. The negative output from $\overline{A}$1214 conditions a second input of $\overline{A}$1210 so this gate produces a positive output signal to block $\overline{A}$1222. Since K02 contains a binary zero the positive output from $\overline{A}$1214 conditions a second input of negative output from 1208 in combination with the negative output from 1214 conditions $\overline{A}$1220. The negative output from 1206 in combination with the negative output from 1212 conditions $\overline{A}$1218. As a result of the value 1010 in K gates 1204 and 1222 are blocked while gates 1218 and 1220 are conditioned. At time 82 the phase 2 clock pulse samples each of the gates 1204, 1218, 1220 and 1222 and gates 1218 and 1220 produce positive output signals to reset K*01 and K*02. Therefore, at the end of time 82 K* contains a value 1001 which is the binary equivalent of 9. At time 83 $\overline{A}$1202 produces a positive output signal to reset the K register, and at time 84 the command K* to K gates the binary value 1001 from the K* register into the K register. It is seen, therefore, that the effect of this cycle of operation is to reduce the count in the K register from 10 to 9.

After eight such cycles of operation the value 2 is entered into the K register. The leads 1270, 1272 and 1276 are connected to the reset output terminals of K02, K03 and K00, respectively, and the lead 1274 is connected to the set output terminal of K01 for the purpose of detecting the presence of a 2 in the K register. The leads 1270, 1272 and 1276 are all connected to $\overline{A}$354 shown in FIGURE 3 and at the next following phase 2 the gate produces an output signal to reset the First Multiply Control flip-flop. This initiates the resetting of the Multiply Sequence Controls as previously explained with reference to FIGURE 3. As shown in the timing diagram of FIGURE 13*b* the count in the Iteration Counter is reduced to zero by the time the Multiply Sequence Controls are completely reset.

ALTERNATIVE EMBODIMENT

The specific embodiment described herein utilizes subtractive type half-adder means 20 and 22, full subtractors 32 and 34, and a borrow pyramid and main adder 44 employing subtractive logic. These elements may be replaced with additive type half-adder means, full adders, and a carry tree and main adder employing additive logic if minor changes are made to account for end around carries.

Consider the addition of minus three and plus four in an additive type adder.

```
    1100       -3
    0100  (+)  +4
    ----
  1 0000
  ----->1  End Carry
    ----
    0001  Sum
```

Consider now the addition of minus three and plus four in a subtractive type adder.

```
  1100       -3
  1011  (-)  -4
  ----
  0001  Sum
```

Note that an end around carry is required for the additive adder but no end around carry is required for the subtractive type adder. It can be shown that for any given pair of operands the additive adder produces an end carry when the subtractive adder does not produce an end borrow and the additive adder produces no end carry when the subtractive adder produces an end borrow.

This immediately suggests that the operation of the forced end borrow circuits 40 and 42 be reversed to produce forced end carries when additive half-adders are substituted for the subtractive half-adders AB and A*B*. This can be accomplished as follows.

In FIGURE 5 the connection between the set and reset output terminals of flip-flop 526 and the gates 528 and 532 are reversed so that the FEB1 flip-flop is set each time the first Q Sensor determines that the partial product is minus one times the multiplicand.

In FIGURE 6 the connections between the set and reset output terminals of flip-flop 626 and the gates 628 and 632 are reversed so that the FEB2 flip-flop is set each time the second Q Sensor determines that the partial product is minus one times the multiplicand.

With this arrangement one additive half-adder means produces sum digits and carry digits which are entered into A*B* and the other additive half-adder means produces sum digits and carry digits which are entered into AB. The forced end borrow circuits now generate forced end carries which are entered into A*, B*, A and B for the purpose of sign extension.

The first and second full subtractors are replaced with first and second full adders. Like the full subtractors, these full adders produce pairs of product digits which are stored in the Q Buffer registers. However, since adders are used carry overflow indications rather than borrow overflow indications are produced.

The first full adder adds the carry in B*00 to A*01 and adds the forced end carry from 40 and the carry from the second full adder to A*00. This operation is similar to the operation when subtractors are used except that a carry rather than the borrow may result. This carry is applied to the second full adder. The second full adder adds the carry in B35 to A37 and adds the forced end carry from 42 and the carry from the first full adder to A36.

The borrow pyramid and subtractive main adder are replaced with a carry pyramid and an additive type main adder. The new unit propagates the carries in B* and half-adds them to the sum digits in the A* register. Also, any carry stored in the second Q buffer as a result of the last full subtract operation is added in to the main adder as an end around carry.

Additive type half-adders and full-adders suitable for use in this embodiment are well known in the art.

While the fundamental novel features of the invention as applied to a preferred embodiment have been shown and described, it will be understood that various omissions and substitutions in the form and details of the device illustrated may be made by those skilled in the art. For example, the present invention is not limited to multipliers using two multiplier digit sensing means but may in the general case employ $n$ sensing means cooperating with $n$ arithmetic elements to form $n$ pairs of product digits on each iterative cycle. It is intended therefore to be limited by the scope of the appended claims.

I claim:

1. In a device for performing binary multiplication in a sequence of iterative cycles, the combination comprising: multiplier storage means; multiplicand storage means; first gating means connected to said multiplicand storage means for producing a first partial product on each of said iterative cycles; second gating means connected to said multiplicand storage means for producing a second partial product on each of said iterative cycles; first sensing means for sensing alternate pairs of digits of said multiplier, said first sensing means including a first gating control circuit and a first carry circuit; second sensing means for sensing the pairs of multiplier digits not sensed by said first sensing means, said second sensing means including a second gating control circuit and a second carry circuit; said first and second gating control circuits being connected to said first and second gating means, respectively, to control the production of said first and second partial products; means for connecting said first carry circuit to said second carry and gating control circuits; and means for connecting said second carry circuit to said first carry and gating control circuits.

2. The combination as claimed in claim 1 wherein said first sensing means includes means to condition said first carry circuit if the sum of the multiplier digits sensed by said first sensing means and the carry from said second carry circuit exceeds the value two, and said second sensing means includes means to condition said second carry circuit if the sum of the multiplier digits sensed by said second sensing means and the carry from said first carry circuit exceeds the value two.

3. The combination as claimed in claim 1 and further comprising: first half-adder means responsive to inputs applied thereto for producing first and second groups of digits; second half adder means responsive to inputs applied thereto for producing third and fourth groups of digits; means for applying the first and second partial products produced by said first and second gating means to said first and second half adder means, respectively, means for applying said third group of digits to said first half adder with a shift of two binary orders to the right; means for applying said fourth group of digits to said first half adder with a shift of one binary order to the right; means for applying said first group of digits to said second half adder with a shift of two binary orders to the right; and means for applying said second group of digits to said second half adder with a shift of one binary order to the right whereby said first and second half adders alternately produce accumulated partial products expressed as two groups of digits.

4. The combination as claimed in claim 3 and further comprising: first arithmetic means responsive to the two low order digits of said first group of digits and the low order digit of said second group of digits for producing a pair of product digits; and second arithmetic means responsive to the two low order digits of said third group of digits and the low order digit of said fourth group of digits for producing a pair of product digits.

5. The combination as claimed in claim 4 and further comprising first end correction means responsive to said first sensing means for applying an end correction digit to said first arithmetic means; and second end correction means responsive to said second sensing means for applying an end correction digit to said second arithmetic means.

6. The combination as claimed in claim 5 wherein said first arithmetic means comprises means responsive to the two low order digits of said first group of digits, the low order digit of said second group of digits, the end correction digit from said first end correction means, and an overflow indication from said second arithmetic means for producing a pair of product digits and overflow indication, and said second arithmetic means comprises means responsive to the two low order digits of said third group of digits, the low order digit of said fourth group of digits, the end correction digit from said second end correction means, and the overflow indication from said first arithmetic means for producing a pair of product digits and an overflow indication; and means for applying the overflow indications from said first and second arithmetic means to said second and first arithmetic means, respectively.

7. The combination as claimed in claim 6 and further comprising means operative after the last accumulated partial product has been formed for half adding the two groups of digits representing said last accumulated partial product, said means being responsive to said second arithmetic means for half adding the last overflow indication produced thereby to said last accumulated partial product to obtain the high order digits of the product.

8. The combination as claimed in claim 7 wherein said multiplier storage means comprises first and second registers, said first sensing means being responsive to the first and second orders of said first register and said second sensing means being responsive to the third and fourth orders of said second register.

9. The combination as claimed in claim 8 and further comprising: means operative on each cycle for transferring the contents of said first register to said second register without shift and for transferring the contents of said second register to said first register with a shift of four binary orders to the right; means responsive to said first arithmetic means for entering a pair of product digits into said first register as the contents of said second register are transferred thereto; and means responsive to said second arithmetic means for entering a pair of product digits into said second register as the contents of said first register are transferred thereto.

10. In a binary multiplier the combination comprising: multiplicand storage means; multiplier storage means; first half-adder means for producing first and second groups of output digits; second half-adder means for producing third and fourth groups of output digits; first and second means each connected to said multiplier storage means for sensing alternate pairs of multiplier digits; first gating means responsive to said first sensing means and said multiplicand storage means for applying 0, 1, 2 or −1 times said multiplicand to said first half-adder means; second gating means responsive to said second sensing means and said multiplicand storage means for applying 0, 1, 2 or −1 times said multiplicand to said second half-adder means; first arithmetic means responsive to the two low order digits of said first group of digits and the low order digit of said second group of digits for producing alternate pairs of product digits; second arithmetic means responsive to the two low order digits of said third group of digits and the low order digit of said fourth group of digits for producing pairs of product digits; first connecting means for applying said first and second groups of digits to said second half-adder means; and second connecting means for applying said third and fourth groups of digits to said first half-adder means.

11. A binary multiplier comprising: a multiplicand storage means; multiplier storage means; first and second means for performing half-add operations and storing first and second differences and borrows; first and second means connected to said multiplier storage means for sensing alternate pairs of multiplier digits stored therein; first gating means responsive to said first sensing means and said multiplicand storage means for applying 0, 1, 2 or −1 times said multiplicand to said first half-add means; second gating means responsive to said second sensing means and said multiplicand storage means for applying 0, 1, 2 or −1 times said multiplicand to said second half-add means; first and second full subtract means responsive to said first and second differences and borrows for producing alternate pairs of digits of a product, said first and second half-add means having interconnecting means whereby said second differences and borrows are applied to said first half-add means and said first differences and borrows are applied to said second half-add means.

12. A binary multiplier as claimed in claim 11 wherein said interconnecting means between said half-add means comprises: means for applying the differences developed by said first half-add means to said second half-add means with a shift of two binary orders to the right with respect to the multiple of the multiplicand applied thereto by said second gating means; means for applying the borrows developed by said first half-add means to said second half-add means with a shift of one binary order to the right with respect to the multiple of the multiplicand applied thereto; means for applying the differences developed by said second half-add means to said first half-add means with a shift of two binary orders to the right with respect to the multiple of the multiplicand applied thereto by said first gating means; and means for applying the borrows developed by said second half-add means to said first half-add means with a shift of one binary order to the right with respect to the multiple of the multiplicand applied thereto.

13. A binary multiplier for multiplying a multiplicand by an N digit multiplier in $N/4$ iterative cycles, $N/4$ being a whole number, said multiplier comprising: multiplicand storage means; multiplier storage means; sensing means connected to said multiplier storage means for sensing two pairs of said multiplier digits during each of said iterative cycles; first gating means connected to said multiplicand storage means and responsive to said sensing means when it senses one of said pairs of multiplier digits for producing a first 0, 1, 2 or −1 multiple of said multiplicand; second gating means connected to said multiplicand storage means and response to said sensing means when it senses the other of said pairs of multiplier digits for producing a second 0, 1, 2 or −1 multiple of said multiplicand; first and second half-adder means, said first half-adder means being responsive on each of said iterative cycles to said first multiple, the differences without borrows, and the borrows from said second half-adder means for producing differences without borrows and borrows, said second half-adder means being responsive on each of said iterative cycles to said second multiple, the differences without borrows, and the borrows from said first half-adder means for producing differences without borrows and borrows; means operative on each of said cycles for performing a full subtract on the two low orders of the differences produced by said first half-adder means to obtain a first pair of product digits; and means operative on each of said cycles for performing a full subtract on the two low orders of the differences produced by said second half-adder means to obtain a second pair of digits of said product.

14. The combination as claimed in claim 13 and further comprising means operative after said $N/4$ iterative cycles have been completed for applying the last differences without borrows and the last borrows produced by said second half-adder means to said first half-adder means to produce final differences without borrows and borrows, and means responsive to said first half-adder means for performing a half-add operation on said final differences without borrows and borrows to thereby obtain the N highest order digits of said product.

15. In a binary multiplier of the type wherein multiplier digits are sensed in pairs and the 0, 1, 2 or −1 multiple of the complement of the multiplicand is half-subtracted from the previously accumulated partial product, the improvement comprising: first means responsive to alternate pairs of sensed multiplier digits for half-subtracting a multiple of said complement of the multiplicand from the previously accumulated partial product to produce a new accumulated partial product; first and second register means for storing the differences without borrow and the borrows produced by said first means; second means responsive to the remaining alternate pairs of multiplier digits and said first and second register means for half-subtracting a multiple of the complement of said multiplicand from each accumulated partial product produced by said first means; third and fourth register means for storing the differences without borrow and the borrows produced by said second half-subtract means; means for applying the accumulated partial product in said third and fourth registers to said first half-subtract means as a previously accumulated partial product; first full subtract means responsive to said first and second register means for producing a pair of final product digits for each time said first means is responsive to sensed multiplier digits; and second full subtract means responsive to said third and fourth register means for producing a pair of final product digits for each time said second means is responsive to sensed multiplier digits.

16. In a binary multiplier of the type wherein multiplier digits are sensed in pairs and the 0, 1, 2 or −1 multiple of the complement of the multiplicand is half-subtracted from the previously accumulated partial product to obtain a new accumulated partial product, the improvement comprising: first register means for storing the differences without borrow and second register means for storing the borrows resulting from said half-subtract operation; and subtractor means responsive to the two low orders of said first register means and the lowest order of said second register means for producing pairs of product digits.

17. In a binary multiplier wherein multiplier digits are sensed in pairs to produce partial products which are the 0, 1, 2 or −1 multiple of the multiplicand, the improvement comprising: first and second means for performing carry-store-add operations to produce accumulated partial products expressed as a series of difference digits and a series of borrow digits, said first means being responsive to the first and succeeding alternate partial products and the accumulated partial products produced by said second means for producing the first and succeeding alternate accumulated partial products, said second means being responsive to the second and succeeding alternate partial products and the first and succeeding alternate accumulated partial products produced by said first means for producing the second and succeeding alternate accumulated partial products; first full subtract means responsive to the two low order difference digits and the low order borrow digit of said first and succeeding alternate accumulated partial products for producing pairs of product digits; second full subtract means responsive to the two low order difference digits and the low order borrow digit of said second and succeeding alternate accumulated partial products for producing pairs of product digits; and means for applying a borrow produced by said first or second full subtract means to the other of said full subtract means.

18. A binary device for multiplying a multiplicand by a multiplier in a sequence of iterative cycles, said device comprising: first and second half-adder means; first and second accumulated partial product storage means responsive to said first and second half-adder means, respectively; multiplier storage means; multiplicand storage means; sensing means responsive to said multiplier storage means for sensing two pairs of multiplier digits during each of said iterative cycles; first gating means responsive to alternate pairs of digits sensed by said sensing means for gating a partial product to said first half-adder means; first transfer means for transferring the content of said second accumulated partial product storage means to said first half-adder means whereby said partial product is half-added to said accumulated partial product to produce another accumulated partial product; second gating means responsive to the remaining pairs of multiplier digits sensed by said sensing means for gating a second partial product to said second half-adder means; second transfer means for transferring the content of said first accumulated partial product storage means to said second half-adder means whereby said second partial product is half-added thereto; and first and second full subtract means for performing full subtract operations on the contents of the two low orders of said first and second accumulated partial product storage means, respectively, to thereby obtain first and second pairs of product digits during each of said cycles.

19. A binary device as claimed in claim 18 wherein said first and second accumulated partial product storage means comprise first and second difference registers and first and second borrow registers, said first gating means includes means to gate a partial product to said first half-adder means without shift; said first transfer means includes means for transferring said second difference register and said second borrow register to said first half-adder means without shift; said second gating means includes means to apply partial products to said second half-adder means without shift; said second transfer means includes means for transferring said first difference register and said first borrow register to said second half-subtract means with shifts of two binary orders and one binary order to the right, respectively, the output from said second half-adder being applied to said second difference register and said second borrow register with shifts of two binary orders to the right and one binary order to the right, respectively.

20. A binary device as claimed in claim 19 wherein said first full subtract means comprises means responsive to the two low order digits in said first difference register, the low order digit in said first borrow register, a borrow signal from said second full subtract means and a forced end borrow from said sensing means for producing a pair of said product digits and a borrow signal, said second full subtract means comprises means responsive to the two low order digits in said second difference register, the low order digit in said second borrow register, a borrow signal from said first full subtract means and a forced end borrow from said sensing means for producing another pair of said product digits and a borrow signal, said sensing means including means to produce a forced end borrow signal when a partial product is 0, 1 or 2 times the multiplicand.

21. The device as claimed in claim 20 and further including arithmetic means operative after $N/4$ iterative cycles and responsive to said first difference and borrow register and a borrow signal from said second full subtract means for performing a final half-subtract operation to obtain the remaining product digits, N being the number of digits in said multiplier.

22. In a device for performing binary multiplication as a sequence of iterative cycles, the combination comprising: multiplicand storage means; multiplier storage means; first and second gating means connected to said multiplicand storage means for producing alternate partial products; first sensing means operative on each cycle for sensing alternate pairs of digits of said multiplier, said first sensing means including a first gating control circuit and a first carry circuit; second sensing means operative on each cycle for sensing the remaining alternate pairs of digits of said multiplier, said second sensing means including a second gating control circuit and a second carry circuit; said first and second gating control circuits being connected to said first and second gating means, respectively, said first carry circuit being connected to said second sensing means, and said second carry circuit being connected to said first sensing means whereby each of said partial products produced by said gating means is determined by the pair of multiplier digits sensed by one of said sensing means and the previous pair of multiplier digits sensed by the other of said sensing means.

23. The combination as claimed in claim 22 wherein said first gating control circuit includes means to control said first gating means to produce a partial product which is 0, 1, 2 or −1 times said multiplicand if the multiplier digits sensed by said first sensing means are 00, 01, 10 or 11, respectively, and there is no carry from said second sensing means, and means to control said first gating means to produce a partial product which is 1, 2, −1 or 0 times said multiplicand if the multiplier digits sensed by said first sensing means are 00, 01, 10 or 11, respectively, and there is a carry from said second sensing means.

24. The combination as claimed in claim 23 wherein said second gating control circuit includes means to control said second gating means to produce a partial product which is 0, 1, 2 or −1 times said multiplicand if the multiplier digits sensed by said second sensing means are 00, 01, 10 or 11, respectively, and there is no carry from said first sensing means, and means to control said second gating means to produce a partial product which is 1, 2, −1 or 0 times said multiplicand if the multiplier digits sensed by said second sensing means are 00, 01, 10 or 11, respectively, and there is a carry from said first sensing means.

25. The combination as claimed in claim 24 and further including: first and second half-subtract means for alternatively performing half-subtract operations; first difference and borrow storage registers for receiving the output of said first half-subtract means, second difference and borrow storage registers for receiving the output of said second half-subtract means, said first half-subtract means being connected to said first gating means and said second difference and borrow registers to half-subtract the complement of said partial products from said second difference and said second half-subtract means being connected to said second gating means and said first difference and borrow registers to half-subtract the complement of said partial products from said first difference; and first and second forced end borrow means responsive to said first and second sensing means for entering borrow signals into said first and second borrow and difference registers.

26. The combination as claimed in claim 25 and further comprising: a first full subtractor responsive to the two low order digits in said first difference register, said first forced end borrow means, a second full subtractor borrow signal, and the low order digit in said first borrow register for producing two product digits and a first full subtractor borrow signal on each of said cycles; and a second full-subtractor responsive to the two low order digits in said second difference register, said second forced end borrow means, a first full-subtractor borrow signal, and the low order digit in said second borrow register for producing a second full subtractor borrow signal and another two product digits on each of said cycles.

27. The combination as claimed in claim 26 wherein said first and second forced end borrow means include circuit means for producing a forced end borrow signal except when the high order digit of the pair of multiplier digits sensed by the respective sensing means is one and either the low order digit of the pair is a one or the other sensing means produces a carry signal.

28. The combination as claimed in claim 27 wherein said multiplier storage means comprises first and second registers; said first sensing means includes means for sensing the two low order digits of said first register; said second sensing means includes means for sensing the third and fourth orders of said second register; means for shifting said multiplier to the right four binary orders as it is transferred from said second to said first register; means for transferring said multiplier from said first to said second register without shift; means for entering the pairs of product digits produced by said second full subtractor into the higher order positions of said second register; and means for entering the pairs of product digits produced by said first full subtractor into the second highest order pair of positions of said first register.

29. The combination as claimed in claim 28 and further comprising means operative after $N/4$ iterative cycles to control said first gating means and said half-subtract means to half-subtract a minus zero from the content of said second difference and borrow registers; and main subtractor means responsive to said first difference and borrow registers and the carry from said second full subtractor for simultaneously froming the N highest order digits of the product, N being the number of digits in said multiplier.

30. In a device for performing binary multiplication in a sequence of iterative cycles, the combination comprising: multiplier storage means; multiplicand storage means; $n$ gating means connected to said multiplicand storage means for producing $n$ partial products on each of said iterative cycles; $n$ sensing means corresponding to said $n$ gating means and each connected to said multiplier storage means for sensing a pair of multiplier digits on each iterative cycle, each of said sensing means including a gating control circuit and a carry circuit; means connecting the gating control circuit of each of said sensing means to a corresponding one of said $n$ gating means; and means for connecting said carry circuit of each of said sensing means to the carry and gating control circuits of another of said sensing means, $n$ being an integer greater than one.

31. A binary multiplier comprising: multiplicand storage means; multiplier storage means; $n$ half-adder means for performing half-add operations and storing difference and borrow digits, $n$ means each connected to said multiplier storage means for sensing pairs of multiplier digits stored therein; $n$ gating means each responsive to one of said sensing means and said multiplicand storage means for applying 0, 1, 2 or $-1$ times said multiplicand to one of said half-adder means; interconnecting means between said half-adder means for applying the difference and borrow digits from each of said half-adder means to another of said half-adder means; and $n$ full subtract means each responsive to the sum and difference digits from a corresponding one of said half-adder means and a carry signal from another of said full subtract means for producing a pair of product digits and a carry signal, $n$ being an integer greater than one.

32. A binary multiplier for multiplying a multiplicand by an N digit multiplier in $N/2n$ iterative cycles, said multiplier comprising: multiplicand storage means; multiplier storage means; $n$ sensing means each connected to said multiplier storage means for sensing $n$ pairs of said multiplier digits on each of said iterative cycles; $n$ gating means each connected to said multiplicand storage means and responsive to a corresponding one of said sensing means for producing a 0, 1, 2 or $-1$ multiple of said multiplicand; $n$ half-adder means each responsive on each of said iterative cycles to one of said multiples, the differences without borrow and the borrows from another of said half-adder means for producing differences without borrows and borrows; and $n$ means each connected to a corresponding one of said half-adder means for performing a full subtract and producting a pair of product digits, $n$ being an integer greater than one.

33. A binary multiplier as claimed in claim 32 and further comprising means operative on each of said iterative cycles for shifting the multiplier in said multiplier storage means $2n$ binary orders.

References Cited by the Examiner

UNITED STATES PATENTS

| | | | |
|---|---|---|---|
| 2,856,126 | 10/58 | Coopper et al. | 235—164 |
| 3,069,085 | 12/62 | Kilburn | 235—164 |

MALCOLM A. MORRISON, *Primary Examiner.*